United States Patent [19]

Nagai et al.

[11] Patent Number: 4,905,040
[45] Date of Patent: Feb. 27, 1990

[54] BOARD COPYING APPARATUS

[75] Inventors: Mamoru Nagai, Tokyo; Yukio Takemura, Kawasaki; Toshiya Kanazawa, Tokyo; Sohei Tanaka, Yokohama; Fumio Mikami, Hachioji; Hiroyuki Nakano, Kodaira, all of Japan

[73] Assignee: Canon Kabushiki Kaisha, Tokyo, Japan

[21] Appl. No.: 117,958

[22] Filed: Nov. 9, 1987

[30] Foreign Application Priority Data

| Nov. 13, 1986 | [JP] | Japan | 61-271466 |
| Nov. 17, 1986 | [JP] | Japan | 61-273510 |
| Nov. 17, 1986 | [JP] | Japan | 61-273511 |
| Nov. 17, 1986 | [JP] | Japan | 61-273512 |
| Nov. 17, 1986 | [JP] | Japan | 61-273513 |
| Nov. 17, 1986 | [JP] | Japan | 61-273514 |
| Nov. 17, 1986 | [JP] | Japan | 61-273515 |
| Jan. 12, 1987 | [JP] | Japan | 62-005832 |
| Jan. 19, 1987 | [JP] | Japan | 62-009457 |

[51] Int. Cl.$^4$ ............................................ G03B 27/52
[52] U.S. Cl. ........................................................ 355/43
[58] Field of Search ........................ 355/3 SH, 14, 69

[56] References Cited

U.S. PATENT DOCUMENTS

| 4,542,985 | 9/1985 | Honma et al. | 355/14 C X |
| 4,624,546 | 11/1986 | Fukushi et al. | 355/3 SH X |
| 4,640,603 | 2/1987 | Honma | 355/3 R |
| 4,648,706 | 3/1987 | Shibasaki et al. | 355/43 |
| 4,662,740 | 5/1987 | Komori et al. | 355/3 SH |
| 4,702,586 | 10/1987 | Saito et al. | 355/3 R |

FOREIGN PATENT DOCUMENTS 0133319 2/1985 European Pat. Off. .
1593767 7/1981 United Kingdom .

Primary Examiner—Donald A. Griffin
Attorney, Agent, or Firm—Fitzpatrick, Cella, Harper & Scinto

[57] ABSTRACT

A board copying apparatus comprising a writing board unit carrying a sheet which enables an image to be written thereon, a copying unit capable of forming, on a recording material, a copy image of an image carried by an original, and also capable of forming, on the recording material, a copy image of the image written on the sheet of the board means, a first density setting device for setting the density of the copy image of the image on the board unit, and a second density setting device for setting the density of the copy image of the image on the original. This arrangement eliminates the necessity for troublesome work for adjusting the copying density each time the copying unit is used in board copying mode for copying the image on the board unit.

28 Claims, 29 Drawing Sheets

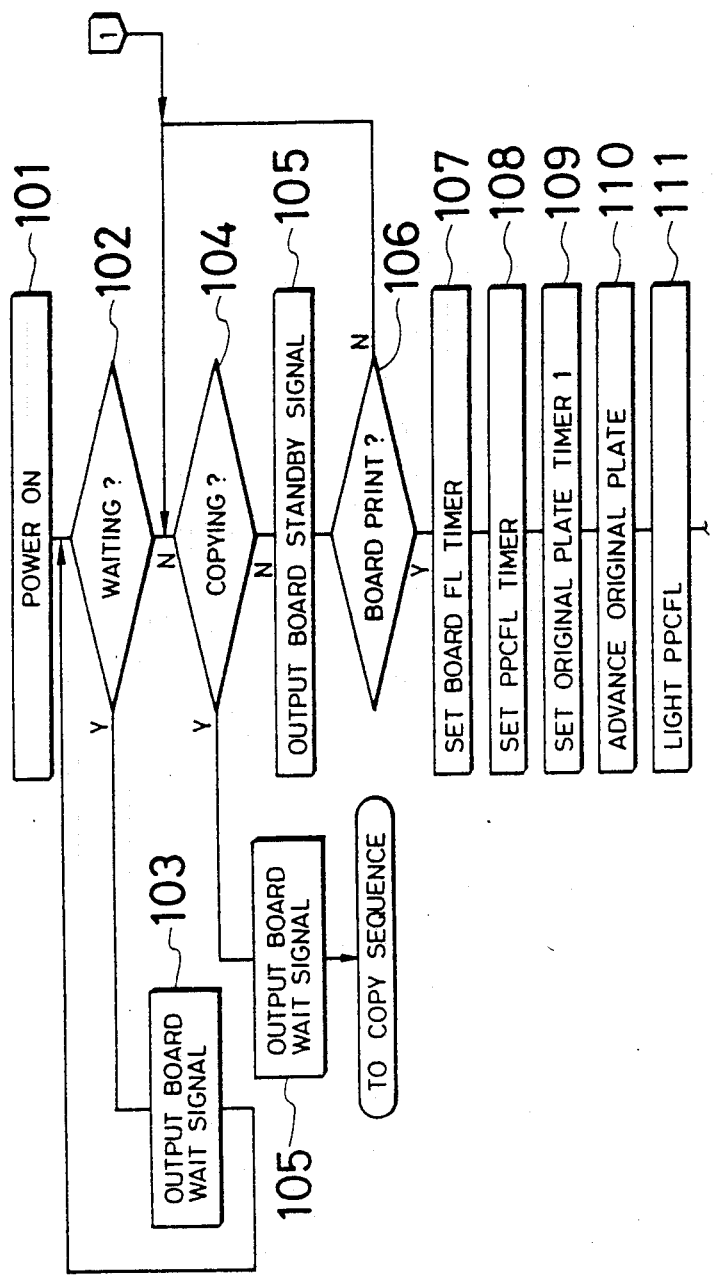

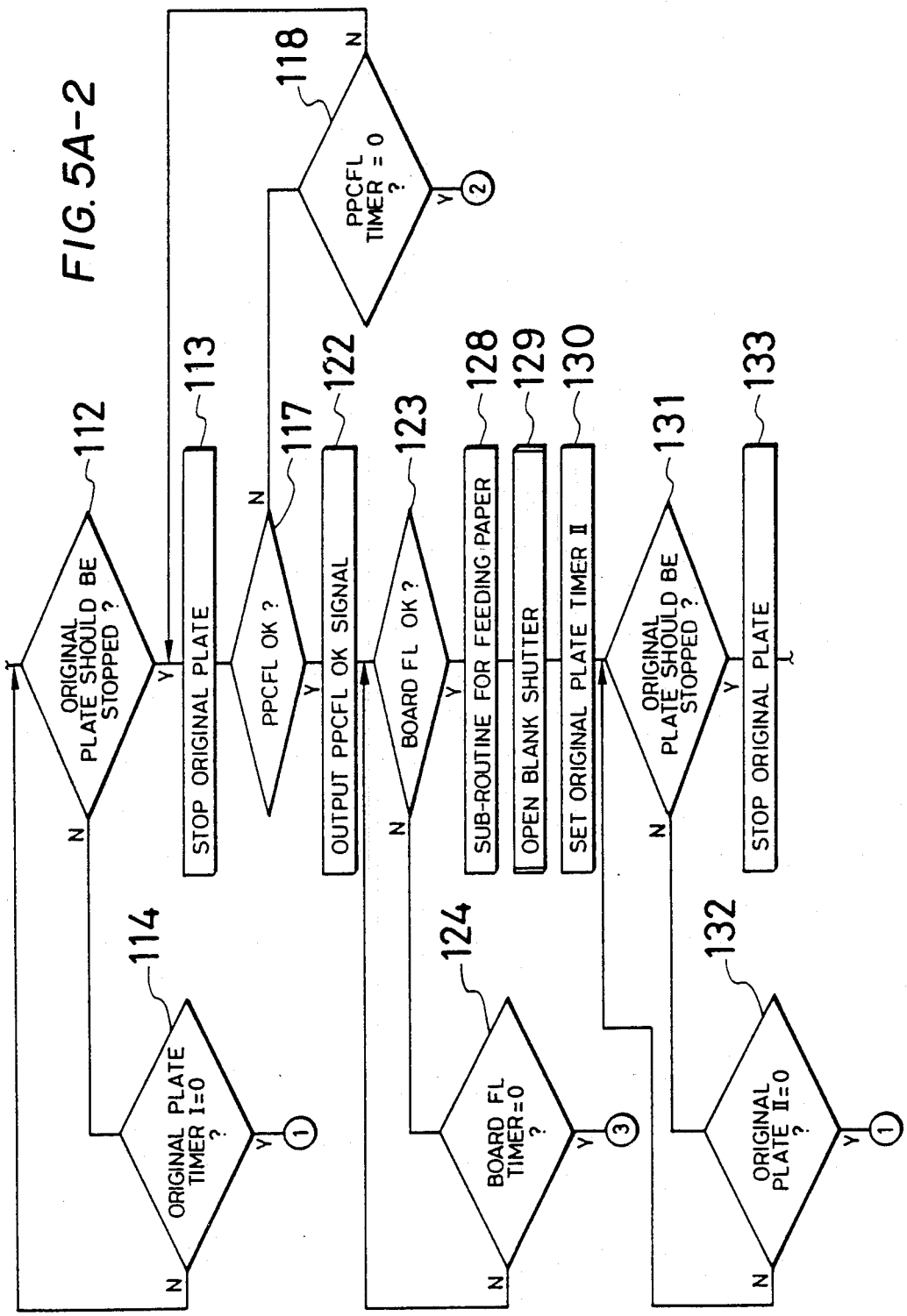

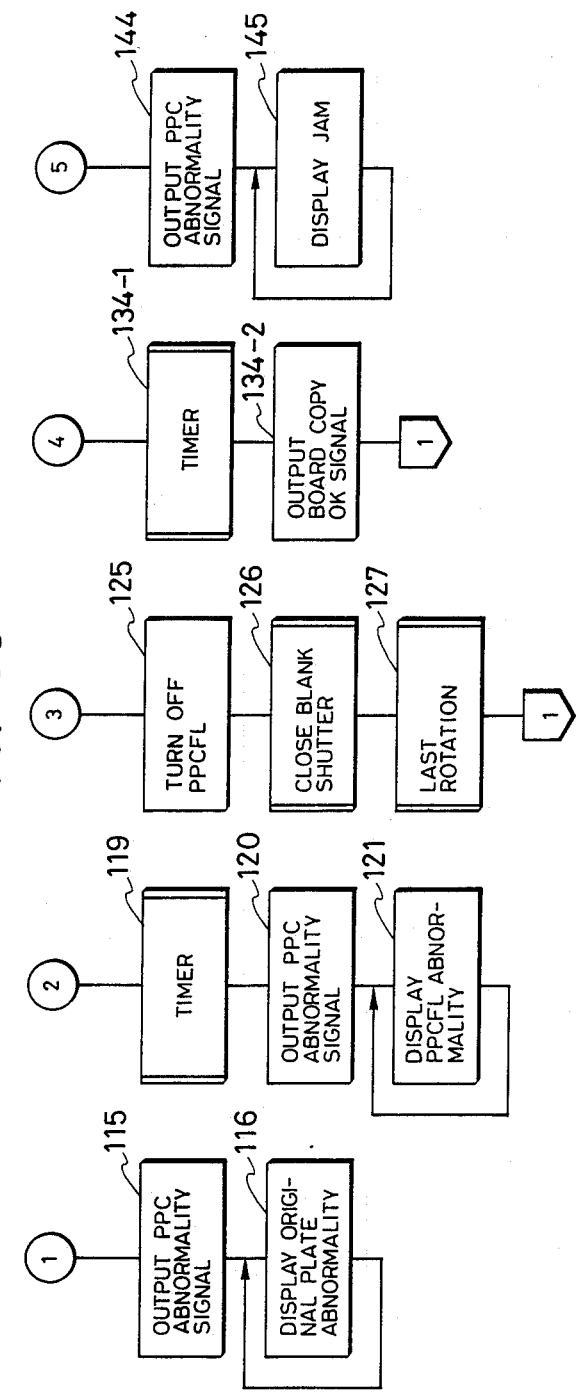

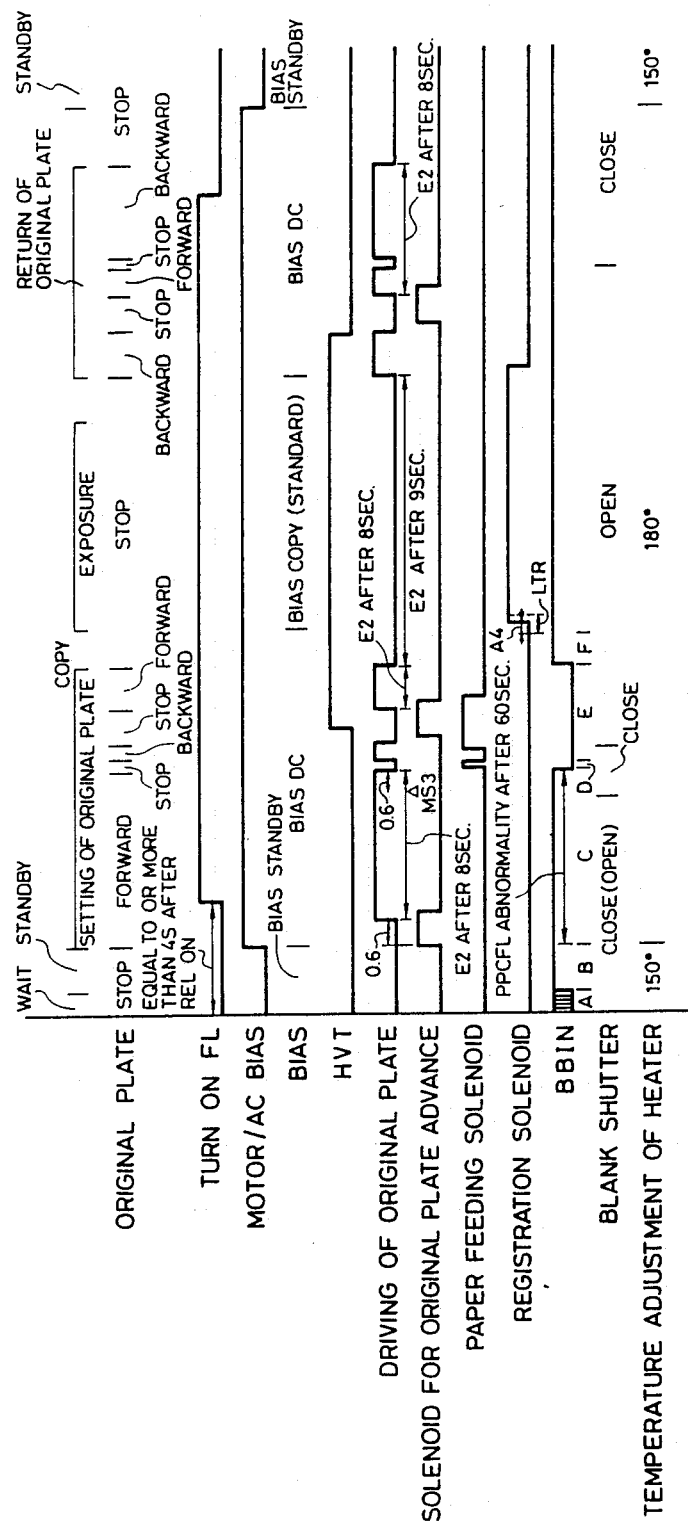

BOARD COPYING APPARATUS

BACKGROUND OF THE INVENTION

1. Field of the Invention

This invention relates to an apparatus for taking a copy of an image formed on a board.

2. Related Background Art

A copying apparatus has been known which is capable of producing a copy of an image written on a writing board. This type of apparatus has a printer which is used exclusively for copying the image written on the board. Thus, the printer produces only the image written on the board. This means that offices have to be equipped with another copier for the purpose of copying various original documents.

To obviate this problem, apparatuses have been proposed which have a copier capable of copying both the image written on the board and the images of original documents. Examples of such apparatus are disclosed, for example, in the specification of the U.S. Pat. No. 4,648,706 and specifications of the U.S. patent application Ser. Nos. 883,653; 921,432; 005,775; 070,193 and 075,992.

In these apparatuses, the adjustment of density of copy is adjusted by means of a density control means which is provided on the copying unit rather than on the board unit.

The writing board usually has a constant level of brightness. It is extremely difficult to operate the density control means to adjust the copy density in conformity with the level of the brightness of the writing board each time the board image is copied.

Another problem resides in that the copying operation may be fail due to any offset in the positional relationship between the image on the board and the copying unit. In such a case, the copying operation has to be suspended and restarting the copying operation requires additional work. It is highly desirable that the copying operation can be restarted without difficulty.

In the operation of the apparatus of the described type, the image written on the writing board is scanned during the copying cycle. In the event that a copying material such as paper has been accidentally jammed, the copying unit is stopped without delay. A smooth and easy restart of the apparatus is required also in this case.

Furthermore, troubles are encountered such as an accidental interruption of continuous copying operation for copying an original on the copying unit, when an instruction is given for preferentially copying a board image during the continuous copying of the original on the copying unit or when the operator has happened to operate the apparatus for copying a board image without being aware of the functioning of the copying unit in the continuous copying mode.

This type of apparatus also requires a special sequence capable of controlling the operations of the board unit and the copying unit which are constructed and mounted separately. When a long time is required for starting up a board illumination lamp, light is unnecessarily introduced to the copying unit until the board illuminating lamp starts up. In addition, it often happens that the board copying operation is stopped due to any failure in the board unit before the copying is actually commenced, while the copy paper sheets have been already fed in response to a copying instruction. In such a case, the paper jams in the copying unit, requiring a laborious work to remove the jammed paper.

The apparatus of the kind described generally employs such a routine that the illuminating lamp for illuminating the sheet on the board is started in advance of the operation for copying an image on the board and the copying operation is actually commenced after the quantity of light from the lamp has reached a level necessary for the copying operation, with the lamp turned off after completion of the process. The time until the required quantity of light is reached does not matter when the ambient air temperature is moderate. The startup of the illuminating lamp, however, is delayed when the ambient temperature is low, so that an impractically long time is wasted before the copying operation is actually commenced. A large difference in the waiting time until the copying unit becomes ready to operate, due to variation in the temperature, is irritating the user.

SUMMARY OF THE INVENTION

An object of the present invention is to provide a novel board copying apparatus having a combination of a copying unit and a board.

Another object of the present invention is to provide a board copying apparatus which is improved to eliminate production of copies of unacceptable quality.

Still another object of the present invention is to provide a board copying apparatus which is improved to enable the board copying operation to be smoothly restarted after an accidental stop of the apparatus;

A further object of the present invention is to provide a board copying apparatus having a first density control means for producing copies at a constant density and a second density setting means for enabling the density of the copy to be varied freely, thereby eliminating troublesome operation which has been required in the known board copying apparatus when a copy is to be formed from an image on the board.

A still further object of the present invention is to provide a board copying apparatus which is capable of shortening the waiting time, i.e., the time from the moment at which a copying instruction is given till the moment at which the apparatus becomes ready to operate, when the apparatus is to be used for copying an image on the board.

These and other objects, features and advantages of the present invention will become clear from the following description of the preferred embodiments when the same is read in conjunction with the accompanying drawings.

BRIEF DESCRIPTION OF THE DRAWINGS

FIGS. 5A to 5C are flow charts illustrating the operation of the copying unit and the board unit;

DESCRIPTION OF THE PREFERRED EMBODIMENTS

Figure 1:
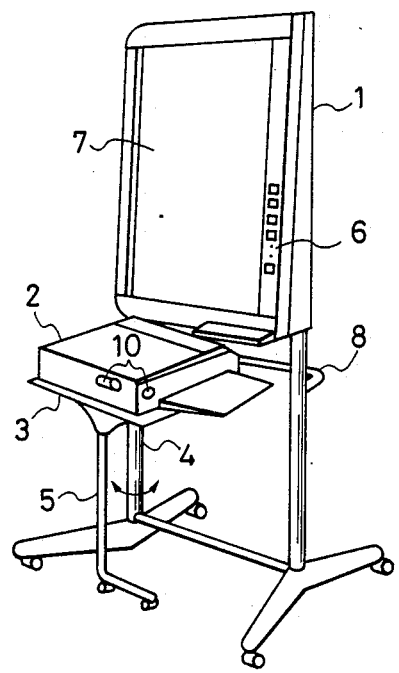
FIG. 1 is a perspective view of a board copying apparatus embodying the present invention.

FIG. 1 is an illustration of the appearance of a copying apparatus which represents an embodiment of the present invention having a board unit 1. As shown in FIG. 1, a copying unit body 2 of the copying apparatus is placed on a support table 3, which is partially supported by legs 4 in such a manner that it can swing about one of the legs 4 by moving in the horizontal direction relative to the floor. An auxiliary leg 5 is fixed to the support table 3 and can be moved together with the support table 3. Other components shown in FIG. 1 are an operation panel 6 of a board unit, a writable white sheet 7 in the form of a belt, an auxiliary pipe 8 of the legs 4, and operation panel 10 used when the copying apparatus is used without the board unit.

Figure 2:
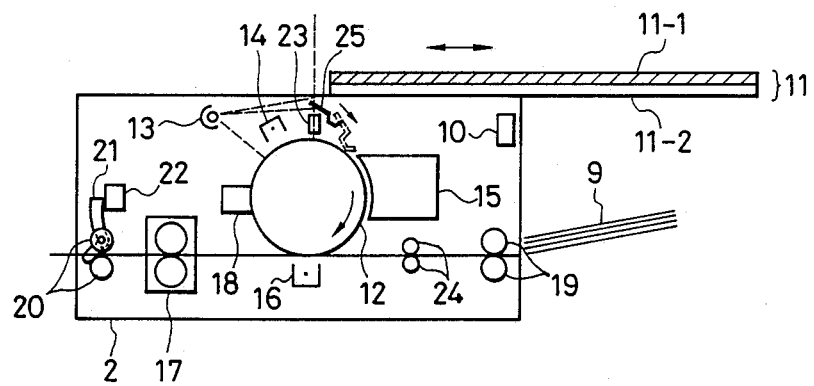
FIG. 2 is a transparent view of a copying unit of the board copying apparatus.

FIG. 2 shows the internal construction of the copying unit body 2 of the copying apparatus having an original plate 11 on which an original is placed at the time of normal copying and which is constituted by an original cover 11-1 and an original plate glass 11-2 and is capable of moving to the left or right as viewed in FIG. 2.

A fluorescent lamp 13 in the copying unit body functions as a pre-exposure lamp for removing residual charge on a sensitive drum 12 uniformly thereover, a blank-exposure lamp for preventing unnecessary toner from attaching to the drum 12 by making a blank-exposure shutter 25 reflect light, and an image-exposure illumination lamp for irradiating the original during the operation in a main-unit copying mode using the copying unit only. At the time of board copying, the support table 3 is moved to a position right below the board unit 1. At the time of original copying using only the copying unit, the support table is moved to the position shown in FIG. 1.

The blank-exposure shutter 25 is closed or opened by the movement of the original plate 11. Other components in the copying unit are a primary-electrifier 14, a developing device 15, a transfer-electrifier 16, a fixing device 17, a drum cleaner 18, feed rollers 19, discharge rollers 20, a discharge lever 21, a photo-interrupter 22 which detects discharge of paper as a beam of light is interrupted and then recovered by the discharge lever 21 so as to confirm completion of discharge of paper, a single-focus lens array 23, and registration rollers 24 for adjusting the leading ends of the image on the drum and a copying sheet relative to each other.

When an original is copied by using the copying unit only, the original plate is moved to the left and right so that the original image is scanned and a latent image is formed on the drum 12. At the time of board copying, the original plate is moved to and stopped at the position as shown in FIG. 2, thereby enabling an latent image to be formed from an optical image supplied from the board unit.

Figure 3:
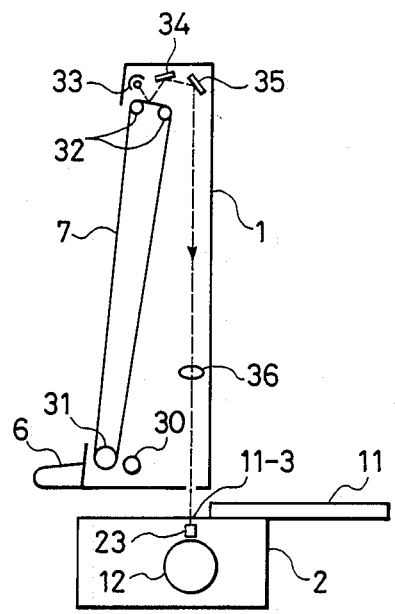
FIG. 3 is a transparent view of a board unit of the board copying apparatus.

FIG. 3 shows a relationship between the internal construction of the board unit 1 and the copying unit 2. A driving roller in the board unit 1 is adapted for moving the sheet 7 and is driven by a motor 30. Light from an image of a figure on the sheet irradiated by a fluorescent lamp 33 passes through an optical system constituted by mirrors 34 and 35 and a lens 36, forms an image on an imaging surface 11-3, and passes through the lens 23, thereby forming an electrostatic latent image on the sensitive drum 12.

Figure 4:
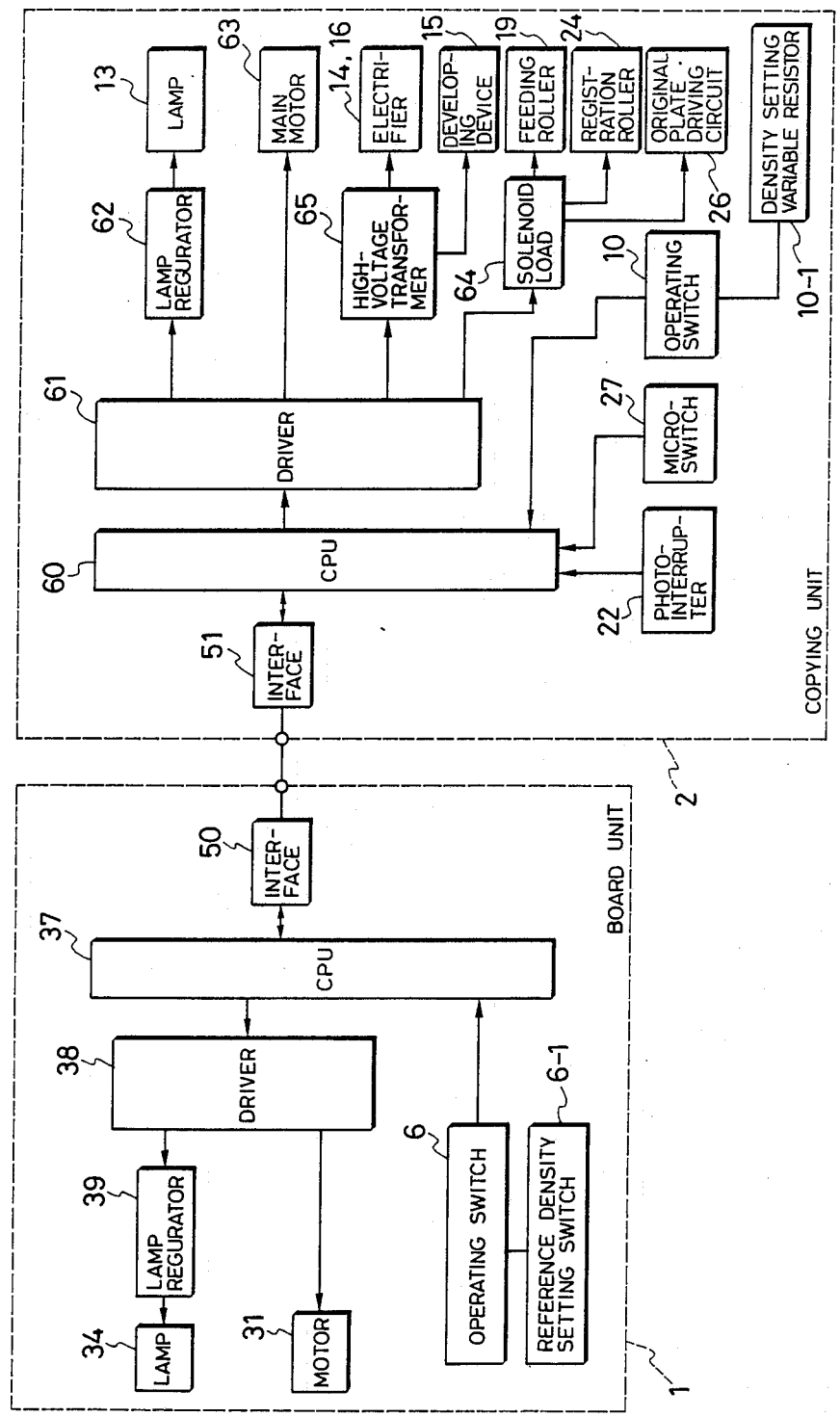
FIG. 4 is a block diagram of the board unit and the copying unit.

FIG. 4 is a block diagram of the constitutions of the board unit 1 and the copying unit 2. These units are controlled by CPUs. A CPU 37 of the board unit is supplied with signals from the operation switch panel 6, and controls the motor 31 and the operation of lighting up the lamp 34 through a driver 38 and lamp regulator 39.

The board unit 1 has a reference density setting switch 6-1 provided in the operation switch panel 6, and the copying unit 2 has a density setting variable resistor 10-1 disposed in the operation switch panel 10. The standard density 6-1 is provided with a switch for setting and adjusting the density which is used to slightly change the standard density set by the switch 6-1.

A CPU 60 of the copying unit 2 is supplied with signals from the operation switch panel 10, and controls the operation of lighting up the lamp 13 and the operation of a main motor 63 which drives the sensitive drum 12, etc., through a drive 61 and a lamp regulator 62. The CPU 60 controls the operation of transporting the paper by the driving force of the main motor 63 transmitted to the feed rollers 19 by a solenoid 44, and controls an original plate driving circuit 26 so as to move the original plate to a predetermined position on the basis of a signal supplied from a microswitch 27 for detecting the position of the original plate. The CPU 60 also controls the voltages applied to the electrifiers 14 and 16 and developing device 15 through a high-voltage transformer 65, and makes the registration rollers 24 rotate so that, after the copy-ready status has been confirmed, copy paper 9 is transported in the direction of the sensitive drum by the timing to adjust the leading ends of the paper and the image relative to each other. The CPUs 37 and 60 interchanges signals through interfaces 50 and 51 so as to establish synchronism between sequences of the board unit 1 and the copying unit 2 in the board copying mode.

Figure 7:
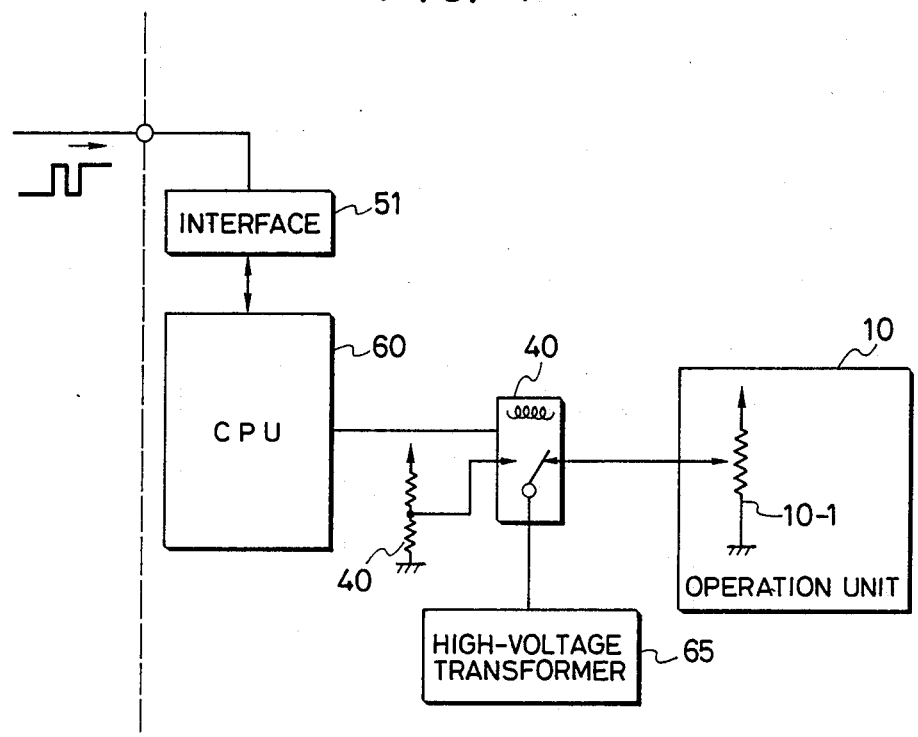
FIG. 7 is a circuit diagram of a standard density switching circuit in the copying unit.

FIG. 7 shows a standard density change-over circuit of the copying unit 2 which is supplied with a signal (pulses) from the standard density setting switch 6-1 of the board unit 1 so that a CPU 60 operates to energize a switch means 40 (relay, semiconductor switch, etc.) for changing over a value set by the density setting variable resistor 10-1 and a certain density value 42, thereby changing the set bias supplied to the high voltage transformer 65.

Figure 8:
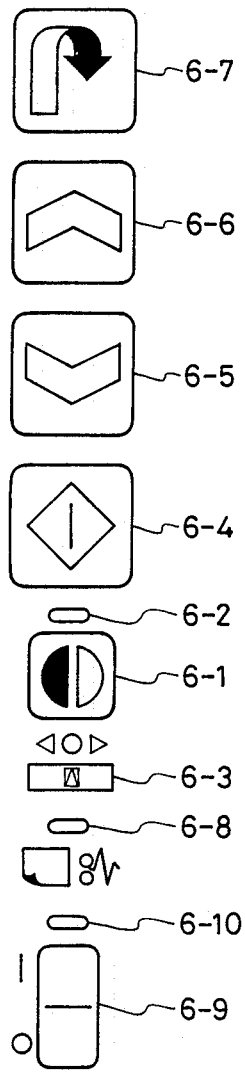
FIG. 8 is an illustration of a control section of the board unit.

FIG. 8 shows the operation panel 6 of the board unit 1. If the above-described standard density setting switch 6-1 is pressed, the standard density is set. If the density setting switch 6-1 is thereafter pressed again, the standard density setting is released, so that the density is set in accordance with the value set by the density setting variable resistor of the copying unit 2. The standard density is preset so that it is suited for the density level on the surface of the belt-like sheet 7. A switch 6-2 is used to effect fine adjustment of the standard density in such a manner that the standard density is unchanged when the switch 6-3 is in the central position, is slightly reduced when the switch is slightly shifted to the right, and is slightly increased when the switch is slightly shifted to the left. A copy button 6-4 is used to start the board copying. A button 6-5 is used to return the belt-like sheet 7 in such a manner that the sheet 7 continues its returning movement while the button 6-5 is being pressed. A button 6-6 is used to supply the sheet 7 in such a manner that the supply of the sheet 7 is continued while this button is being pressed. A button 6-7 is used to continue the supply of the sheet 7 until the next frame is displayed. Once this button is pressed, the sheet 7 is automatically supplied to the position at which the next frame is set. The sheet 7 can provide two frames. An indicator 6-8 indicates occurrence of a jammed state of copy paper in the copying unit and an abnormal state of the copying unit. A power switch 6-9 also functions as a power switch of the copying machine 2, and an indicator 6-10 indicates the on-state of the power switch. The indicator 6-10 is adapted to alert the operator by being turned on and off when board copying cannot be performed, that is, during a waiting period after the power source has been turned on or during the copying operation using only the copying unit.

Figure 9:
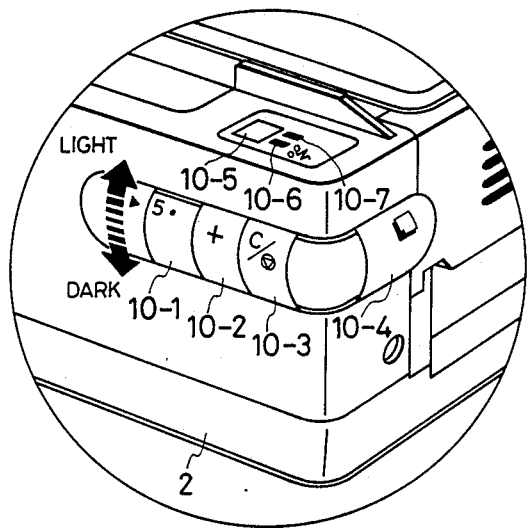
FIG. 9 is an illustration of a control section of the copying unit.

FIG. 9 shows the operation panel 10 of the copying unit 2. The above-described density adjusting variable resistor is used to adjust the density by being rotated as indicated in FIG. 9. A key 10-2 is used to set the number of copies, and the setting is incremented by a value corresponding to one copy each time the key 10-2 is pressed. A clear-stop key 10-3 is used in such a manner that it is pressed to set the number of copies to 1 when copying is not performed, and is pressed, during continuous copying, to stop the copying operation after the present copy has been completed. A copy start key 10-4 is used to start copying using only the copying unit 2. While the copying unit 2 is in the position at which board copying is performed, main-unit copying is not started even if the copy start key 10-4 is pressed. An indicator 10-5 is adapted to indicate the set number of copies and the number of remaining copies. An indicator 10-6 indicates occurrence of a jammed state of copy paper, and an indicator 10-7 indicates the on state of the power source. The indicator 10-7 is turned on and off during waiting and is lighted up when the copying operation becomes possible.

Outlines of the constructions and control of the board unit 1 and the copying unit 2 have been described. The detail of the operation of this embodiment will be described below with reference to flow charts shown in FIGS. 5A to 5C and a timing chart shown in FIG. 6.

Figures 3, 5A:
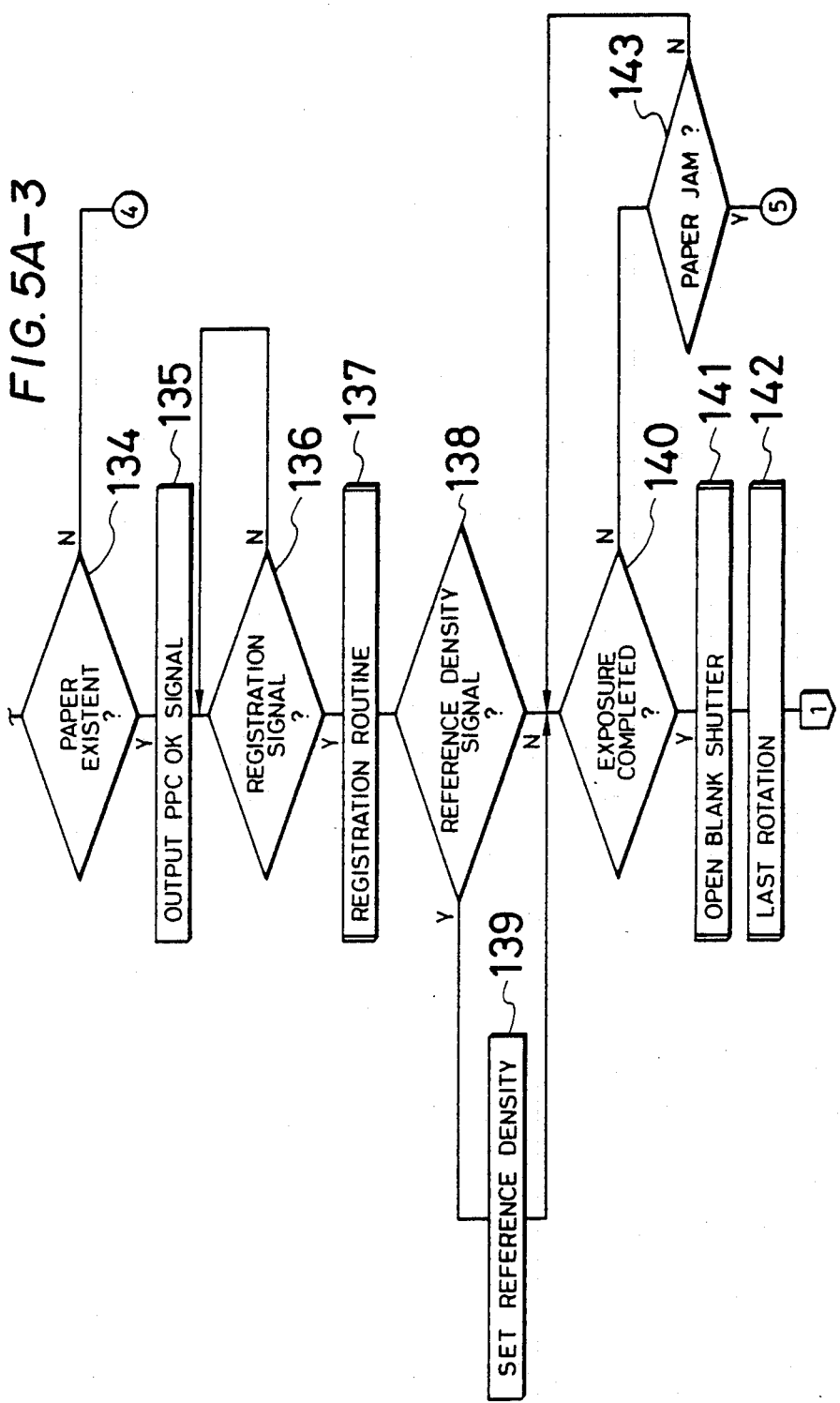
Figures 1, 5B:
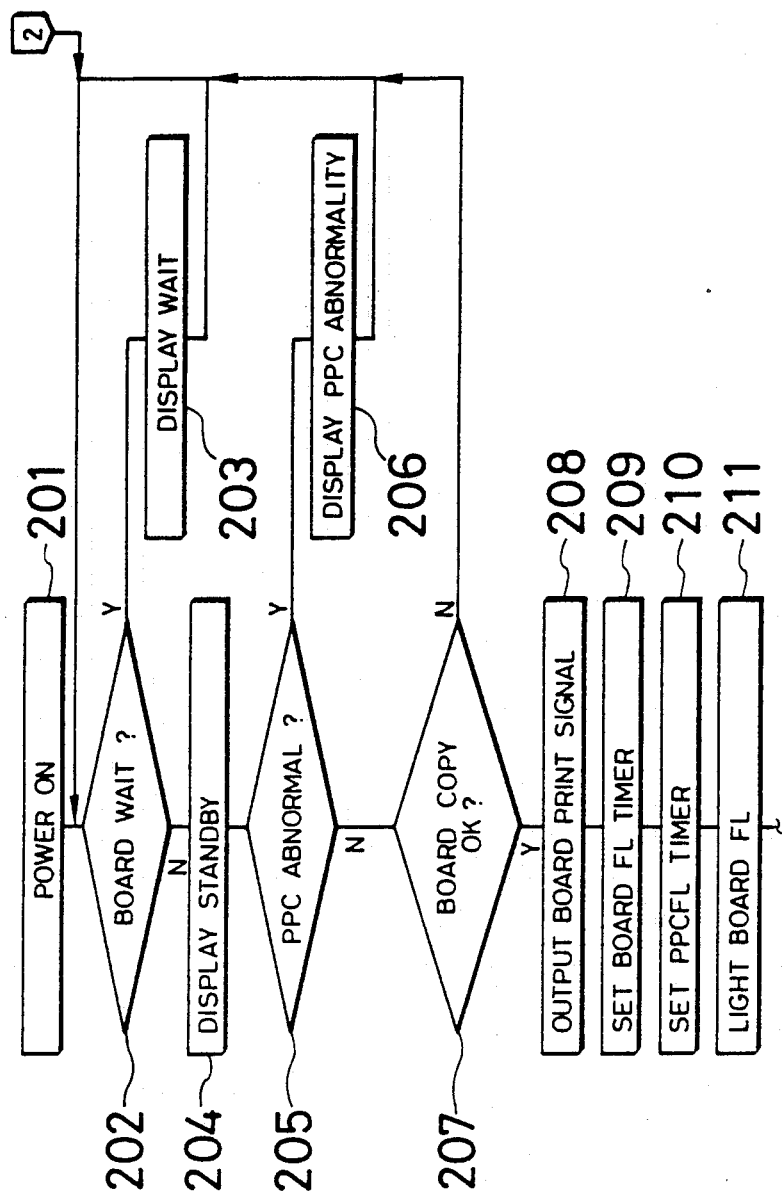
Figures 2, 5B:
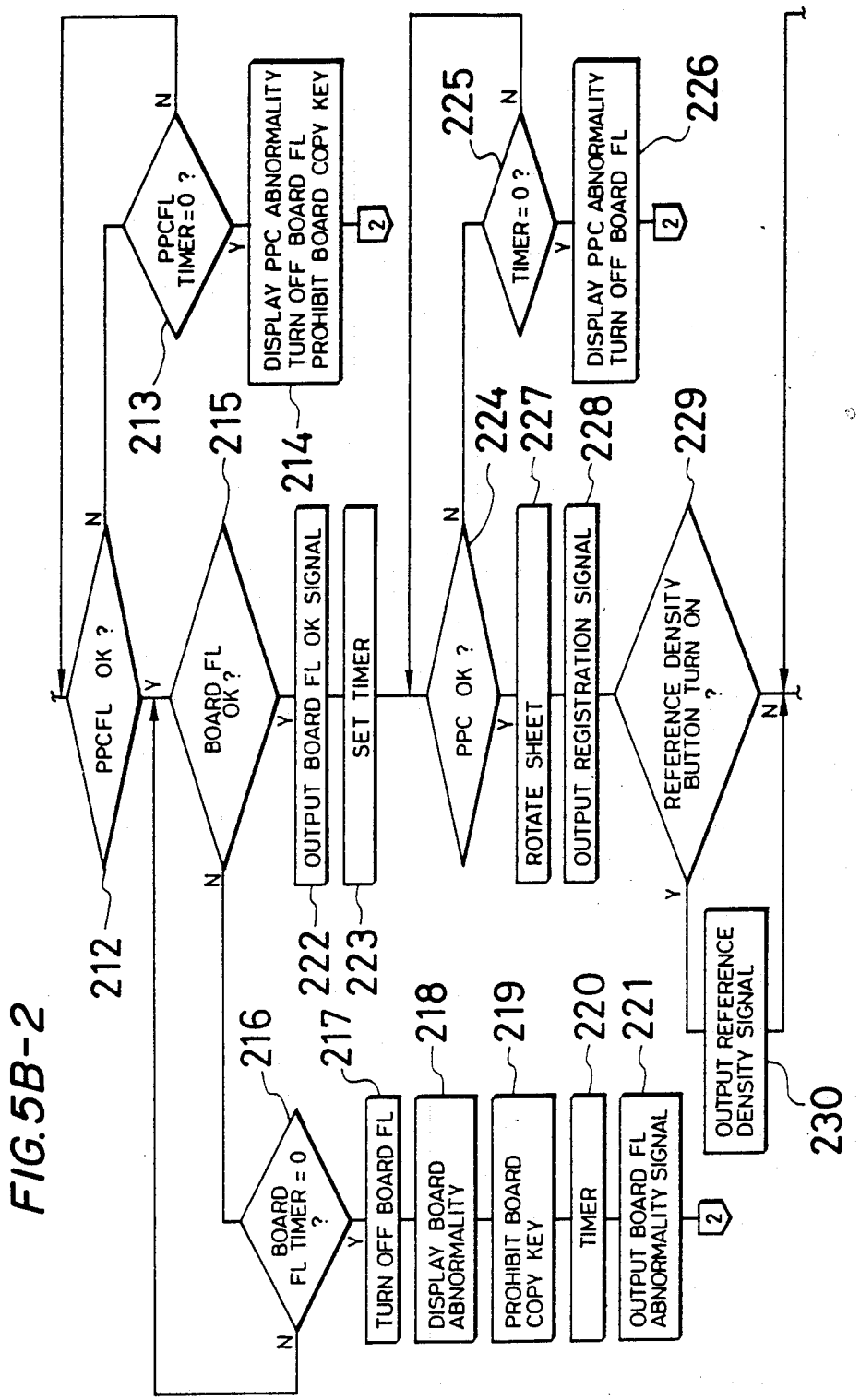
Figures 3, 5B:
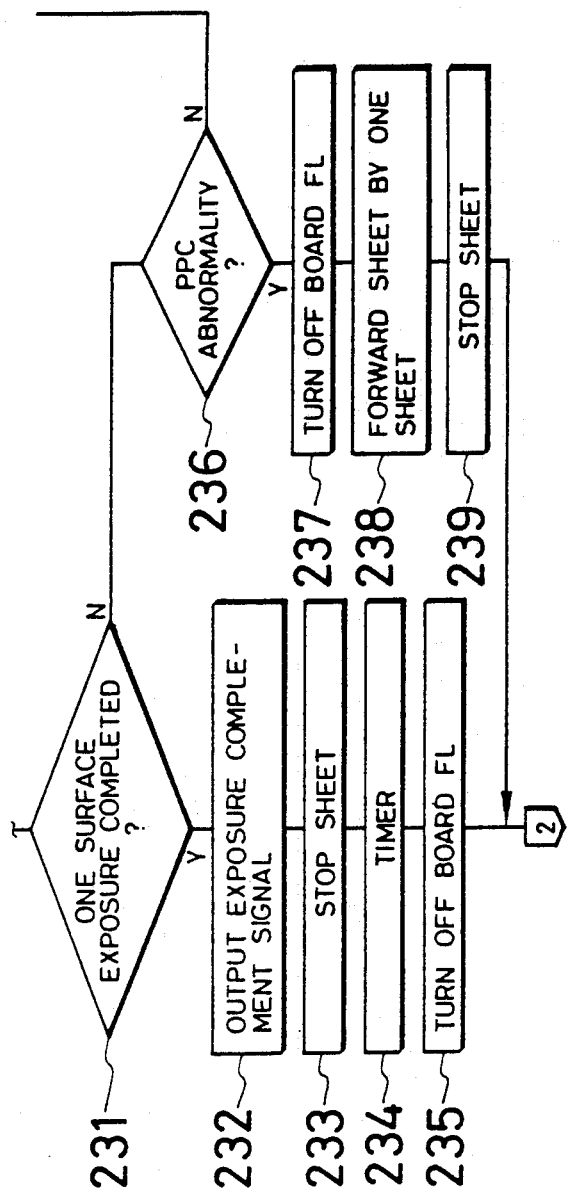
Figures 2, 6:
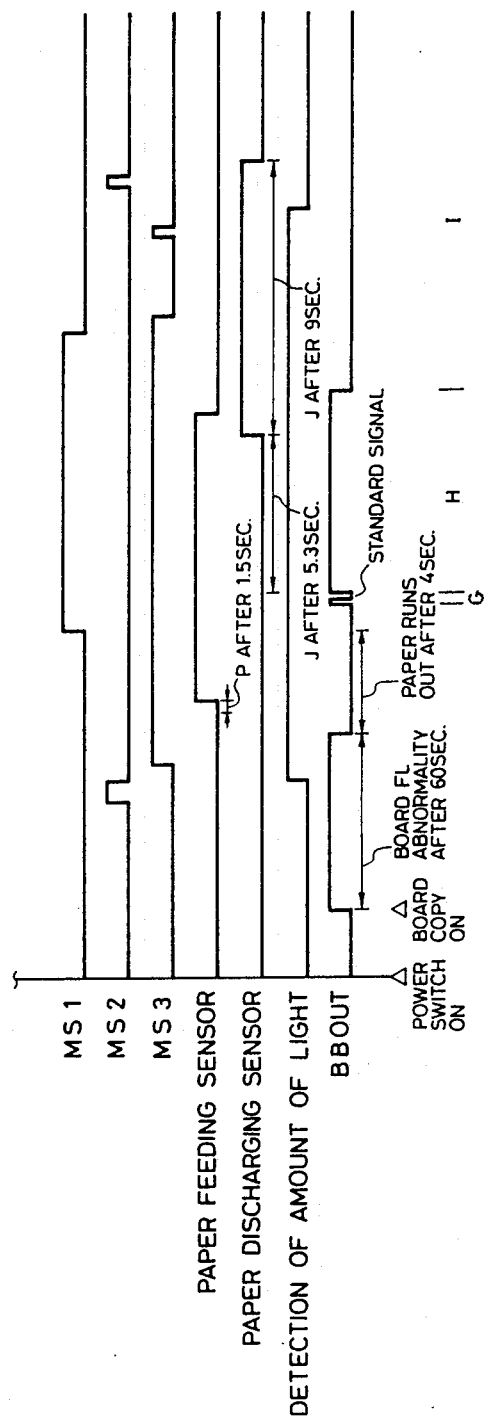
FIG. 6 is a timing chart of operation in a board copying mode.

When the power switch 6-9 in the operation panel 6 of the board unit 1 is turned on, the copying unit 2 starts a routine 101 in the control flow chart of the copying unit 2 shown in FIG. 5A. At the same time, the board unit 1 starts a routine 201 in the control flow chart of the board unit 1 shown in FIG. 5B. The copying and board units also start the same routines when a jam-disposal door provided in the copying unit 2 is opened and is, after disposal, closed. The copying unit 2 is in waiting until the temperature of the fixing device 17 becomes equal to a set temperature, and outputs oscillation pulses (board-wait signal) to the board unit 1 (103) while waiting (102). The copying unit 2 also outputs oscillation pulses (board-wait signal) to the board unit (105) during copying performed by the copying unit only (104). The board unit 1 receives the oscillation pulses (board-wait signal) identifies the waiting state (202) and shows a wait display in the indicator 6-10 (203). The board unit 1 does not start the routine in which it accepts the board print key until the oscillation pulses (board-wait) signal disappear. The operations described hereinbefore correspond to a period A in the timing chart shown in FIG. 6 (BBIN indicates the output signal from the copying unit). Next, when the copying unit 2 reaches standby mode, it outputs a board-standby signal (high level) to the board unit, and the board unit receives this signal and waits until the board print key (207) is pressed. However, if an abnormality such as a temperature abnormality of the fixing device occurs in the copying unit in this period of time, the copying unit outputs a PPC abnormality signal (low level), and the board unit receives this signal and identifies the abnormal state of the copying unit (205), makes a display in the indicator 6-10 showing that the copying machine is in the abnormal state (206), and does not accept the board print key. However, during this period, the key for supplying the sheet of the board unit can always be accepted. The operations described therein before correspond to a period B in the timing chart shown in FIG. 6. If the board print key is pressed during the board-print standby (207), a board print signal is issued from the board unit 1 (208) (the level of the signal BBOUT in the timing chart becomes high). Simultaneously, the fluorescent lamp 33 of the board unit 1 is lighted up (211). The time taken to detect abnormalities of the fluorescent lamp 33 is set (209) because the fluorescent lamp has characteristics of increasing the quantity of light depending on the ambient temperature and takes a certain time to become able to emit the necessary quantity of light and there is a possibility of the lamp failing to light if the temperature is abnormally low. The time taken to detect abnormalities of the fluorescent lamp 13 of the copying unit 2 is also set (210) because the copying unit lights up the fluorescent lamp 13 by the same timing. The copying unit receives the board print signal (106), lights up the fluorescent lamp 13, sets a timer for detecting abnormalities of the fluorescent lamp 33 of the board unit in the same manner as in the board unit (107), sets a timer for detecting abnormalities of the fluorescent lamp 13 of the copying unit (108), and makes the original plate advance in order to perform board copying (110). The original plate is moved forward to the position to close the blank shutter by the output from a sensor such as a microswitch (112), and is thereafter stopped (113). However, if the original plate cannot be moved due to some abnormality, or if the original plate does not reach the stop position within the maximum necessary time (109) taken to move thereto (114), this state is indicated by the indicator 10-6 as an original plate abnormality (116 in FIG. 5C). Simultaneously, the copying unit outputs a PPC abnormality signal to the board unit (115). When the original plate is stopped at the stop position, whether or not the quantity of light emitted from the fluorescent lamp of the copying machine has reached the necessary value (117), and the state in which the necessary quantity of light is obtained is waited (118). If, after the time set by the PPCFL timer (108) has passed, the necessary quantity of light is not obtained, the lighting is judged to be abnormal, and the process proceeds to a routine after 119 in FIG. 5C. If the necessary quantity of light is obtained within the set time, the copying unit outputs a copying unit lamp OK signal to the board unit (122), and the board unit waits this signal (212). If the set time 108 and the set time 210 are equalized, the board unit can detect the abnormality of the fluorescent lamp at the input signal level of the interface (BBIN) simultaneously with the copying unit (213). The board unit thereafter displays the abnormality of the copying unit in the indicator 6-8, turns of the fluorescent lamp off the board unit, prohibits acceptance of the board print key, and starts another key waiting routine. After the moment (119) at which the board unit will have detected the fluorescent lamp abnormality of the copying unit, the copying unit outputs a copying unit abnormality signal in order to prohibit the print key input of the board unit, and displays the copying unit lamp abnormality in the indicator 10-5 (121). (Operations described hereinbefore correspond to a period C in the timing chart.)

Next, after the quantity of light emitted from the fluorescent lamp 13 of the copying unit has reached the necessary value, the operation of detecting an abnormality of the fluorescent lamp 33 of the board unit is performed (123, 124, 215, 216) in the same manner as in the above case of the detection of an abnormality of the copying unit fluorescent lamp. When an abnormal state occurs, the copying unit turns off the fluorescent lamp 13, starts an original plate moving sequence in order to close the blank shutter (126), thereafter starts a rotation sequence (127), and is returned to the standby state. The board unit turns off the fluorescent lamp (217), displays the board abnormality (218), prohibits the board copy key input (283), and makes the BBOUT low level (221) after the moment (220) at which the copying unit will have detected the fluorescent lamp abnormality of the board unit (220). After the quantity of light emitted from the fluorescent lamp of the board unit has reached the necessary value, the board unit outputs a board unit lamp OK signal (222) (that is, reduces the BBOUT to the low level). (Operations described hereinbefore correspond to a period C in the timing chart.) The copying unit receives the board FLOK signal, supplies the paper (128), moves the original plate in order to open the blank shutter (129), stops the original plate at a position (131) to enable the formation of the optical path (133). If, at that time, there is some sheets of paper in the paper supply section (134), the copying unit outputs a signal which indicates the ready status of the copying unit (135). During this period, the board unit sets a paper-deficiency timer (223) and detects paper deficiency and abnormality of original plate in the same manner (224, 225, 134-1, 134-2). In the case of paper deficiency, the indicator 6-8 is kept lit indicating the PPC abnormality (226), but the board unit and the copying unit do not prohibit the acceptance of the next board print key input. (These operations correspond to a period E in the timing chart.)

After the operation in the board print mode has made ready by normally supplying the paper, the board unit operates to rotate the sheet 7 (227) and outputs a registration timing signal (228). (This operation corresponds to a period F in the timing chart.) The copying unit receives this signal (136) and drives the registration rollers so as to transport the copy paper (137). If the standard density setting button 6-1 in the operation panel of the board unit has been pressed (229), the board unit outputs a standard density signal (229) (that is, issues pulses as indicated at G in the timing chart). The copying unit receives the standard density signal (138) and drives the bias change-over circuit shown in FIG. 7 so as to set the standard density bias (139). When exposure corresponding to one frame on the sheet has been completed (231), the board unit outputs a completion signal (232), stops the supply of sheet 7 (233) (during a period H in the timing chart), turns off the fluorescent lamp 33 of the board unit after a predetermined time has passed (234, 235), and assumes a standby mode. When the copying unit receives the exposure completion signal (140), it starts a routine of closing the blank shutter 25 (141), thereafter executes the rotation routine for cleaning the drum (142), and assumes the standby mode. (These operations correspond to a period I in the timing chart.) If paper jamming occurs during the exposure of the sheet 7 (143), the copying unit outputs a copying unit abnormality signal (144) (that is, changes the BBIN from high to low level), a display in the indicator 10-7 indicate the jammed state, and stops (145). The board unit receives its signal (236), turns off the fluorescent lamp 33 of the board unit (237), stops the sheet 7 after moving this sheet from the exposure start position to an extent corresponding to one frame (238, 239), and proceeds to a key input waiting routine. Otherwise, the sheet 7 may be stopped after being moved or returned to the exposure start position, thereby enabling the copying operation to be recommenced rapidly.

In the above-described embodiment, various types of abnormalities are displayed by the jam indicator, number-of-copy indicator and wait indicator so that one or more items of display are shown by one indicator. However, multiple indicators, each of which is used to show only one item of display, may be provided instead. It is also possible to make the number-of-copy indicator display codes which represent different types of abnormalities.

Next, the operation of dealing with the case in which the copying unit 2 or the board unit 1 deviates from a suitable position relative to each other will be described below in detail.

Figure 10:
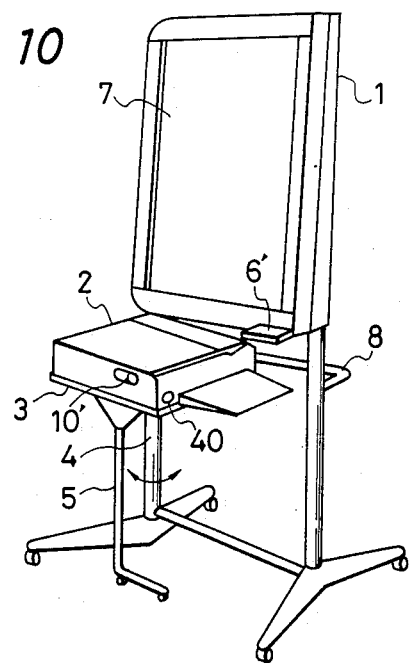
FIG. 10 is a perspective view of a board copying apparatus.

FIG. 10 shows the appearance of another board copying apparatus. Components identical with those shown in FIG. 1 are indicated by the same reference characters. This apparatus is provided with a board unit 1 having an operation panel 6', a copying unit 2 having an operation panel 10', and a microswitch 40 for detecting the relative positions of the copying unit 2 and the board unit 1. Other components are identical with corresponding components shown in FIG. 1 and, therefore, the descriptions for them will not repeated.

Figure 11:
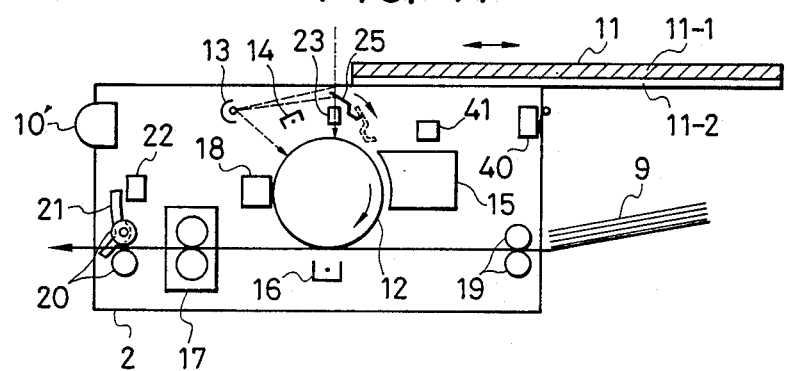
FIGS. 11 and 12 are illustrations of the internal structure of the embodiment.

FIG. 11 is an illustration of the internal construction of the copying unit body, in which components identical with those shown in FIG. 2 are indicated by the same reference characters. The copying unit is provided with a solenoid adapted to operate the blank exposure shutter 25 so as to change over the blank exposure and the image exposure. Other components are identical with corresponding components shown in FIG. 2 and the description for them will not be repeated.

Figure 12:
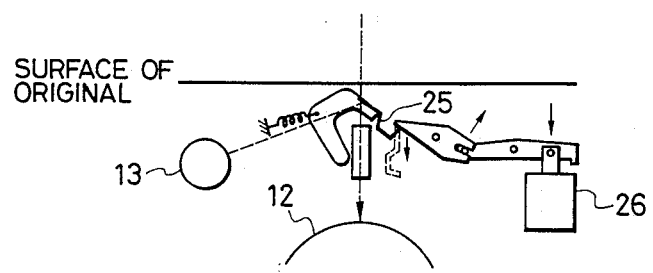

FIG. 12 is an illustration of part of the internal construction of the copying unit shown in FIG. 11.

Figure 13:
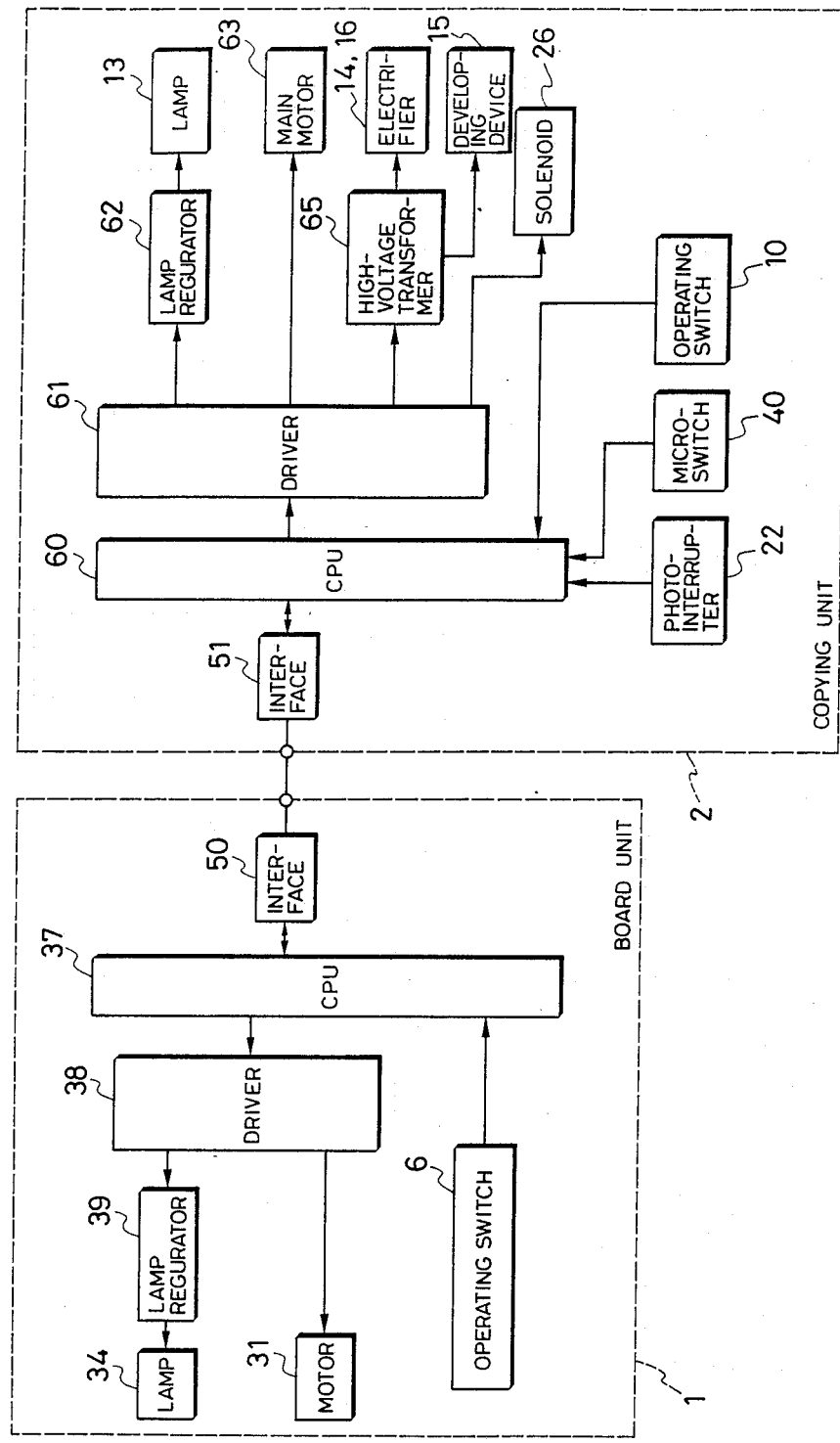
FIG. 13 is a block diagram of an electric circuit of the embodiment.

FIG. 13 is a block diagram of the board unit 1 and the copying unit 2. The CPU 60 of the copying unit is supplied with an output signal from the microswitch 40, judges whether the present mode is the board copying mode (corresponding to the on state of the microswitch 40) or the main-unit copying mode (corresponding to the off state of the microswitch) so as to supply information on the present mode to the board unit. In this embodiment, the microswitch 40 is connected to the copying unit, but the same effect can be realized when the microswitch is connected to the board unit.

Figure 14:
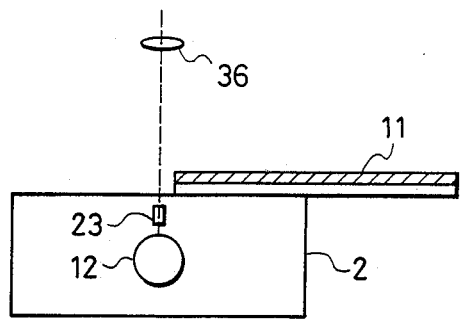
FIG. 14 is an illustration of the position of an original plate in the board copying mode of operation of the apparatus.
Figure 15:
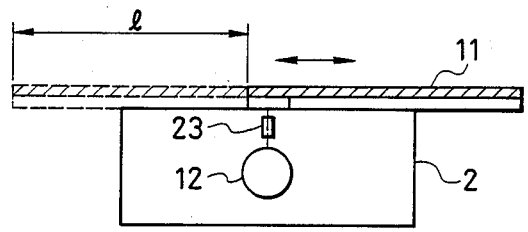
FIG. 15 is an illustration of the movement of the original plate during operation of the apparatus in the main unit copying mode.

FIG. 14 shows the position to which the original plate is moved in the board copying mode. FIG. 15 shows the range of movement of the original plate in the main-unit mode. In FIG. 15, l indicates the scanning distance.

Figure 16:
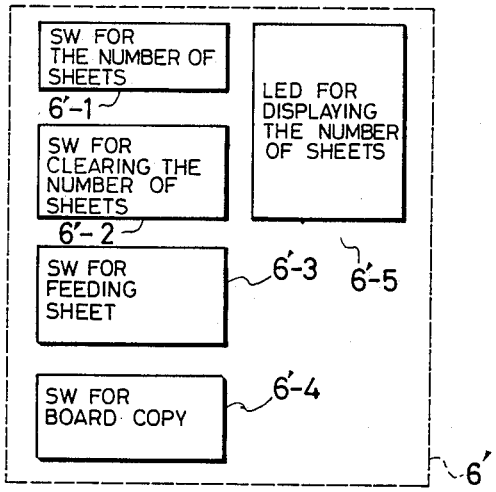
FIG. 16 is an illustration of control sections of the board unit and the copying unit.
Figure 16:
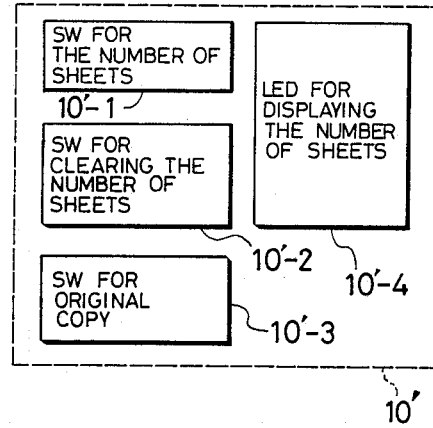

FIG. 16 shows a block diagram of the functions of the operation panels. The board operation panel 6' is constituted by a switch 6'-1 for setting the number of copies, a switch 6'-2 for clearing the set number of copies, a switch 6'-3 for supplying the sheet, a board copying switch 6'-4, and an LED 6'-5 for indicating the number of copies. The copying unit operation panel 10' is constituted by a switch 10'-1 for setting the number of copies, a switch 10'-2 for clearing the set number of copies, an original copying switch 10'-3, and an LED 10'-4 for indicating the number of copies. Input and display operations of the number-of-copy setting switches 6'-1 and 10'-1 and the clearance switches 6'-2 and 10'-2 in the two panels can be performed in the board copying mode. However, in the board copying mode, the number of copies which are copied by the operation of the board copying switch 6'-4 corresponds to that set (displayed) through the board operation panel while, in the main-unit copying mode, the number of copies which are actually copied corresponds to that set (displayed) through the copying unit operation panel, thus improving the operational performance.

The operation panels may be of the types shown in FIGS. 8 and 9.

Figure 17:
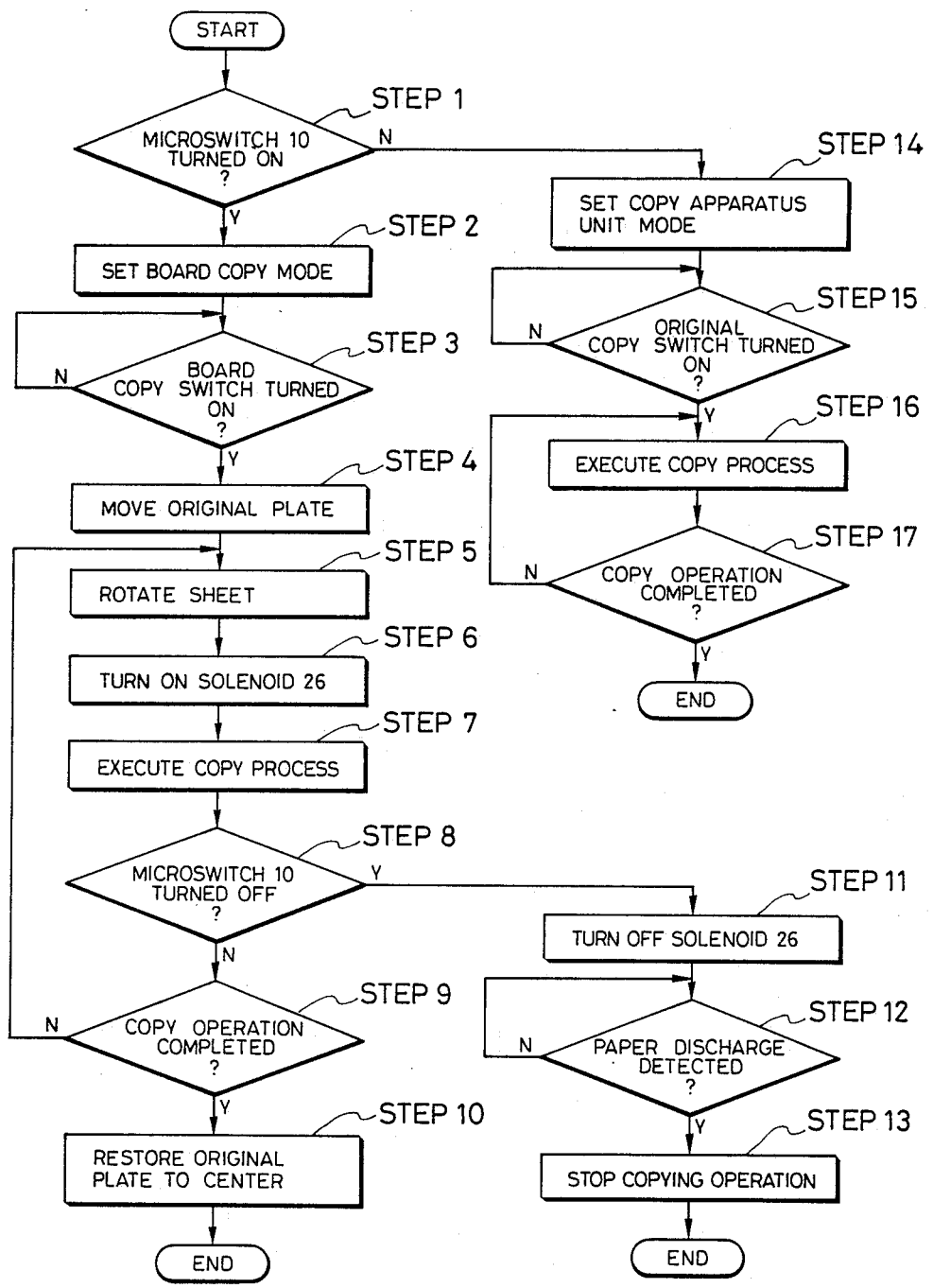
FIG. 17 is a flow chart showing the operation control performed in the embodiment of the invention.

The operation in accordance with this embodiment will now be described with reference to FIG. 17.

When the copying unit 2 supported on the support table 3 shown in FIG. 10 is turned about the leg 4 toward the board, the microswitch 40 is brought into contact with the auxiliary pipe 8 so that it is turned on. This on state is detected (Step 1), and the board copying mode is thereby selected (Step 2). At this time, an optical path shown in FIG. 12 is formed through the blank exposure shutter 25 when this shutter is in the position indicated by the solid line in FIG. 12. If a copying command sent from the board copying switch 6'-4 in the operation panel 6' is input (Step 3), the original plate 11 moves to the right-end position shown in FIG. 14 (Step 4) so that it does not obstruct the optical path from the board. Next, the sheet 7 starts to move by the drive of the motor 30 (Step 5) and, simultaneously, a solenoid 26 shown in FIG. 12 operates (Step 6) so that the blank shutter 25 moves to the position indicated by the broken line in FIG. 4, thereby exposing the sensitive drum to the image on the sheet 7. The rotation of the sensitive drum 12 is in synchronism with the rotation of the sheet 7, the image on the sheet 7 is copied by a well-known electrophotographic processing (Step 7). After the operation of forming a set number of copies is completed (Step 9), the original table 11 is returned to the central portion (Step 10).

If, during the board copying operation, the board unit 1 or the copying unit 2 deviates from a suitable position relative to each other, this deviation is detected by the microswitch 40 (Step 8) and, simultaneously, the operation of the solenoid is stopped (Step 11). The blank shutter 25 is returned to the position indicated by the solid line in FIG. 12 so as to reflect the light emitted from the lamp 13 and erase the electric charge on the sensitive drum 12, thereby enabling the copying process to proceed without consuming the toner. After the discharge of the paper has been confirmed by the photointerrupter 22 (Step 12), the copying operation is terminated (Step 13).

At this time, the sheet 7 in the board unit 1 is stopped at a position distanced from the exposure start position by the length of one frame. To recommence the copying operation, the sheet may be moved or returned to the exposure start position.

If the apparatus in accordance with the present invention is used as an ordinary copying apparatus, the operation panel 10' on the copying unit 2 is used. The board unit 1 is operated by the operation through the operation panel 10'. The original plate 11 moves within the range indicated in FIG. 15 so that the drum 12 is not irradiated with external light. If, while the microswitch 40 is in the off state, the main-unit mode is selected (Step 14) and if an original copying command is input through the operation panel 10' (Step 51), the solenoid 26 operates in the same manner as in the case of board copying so that the blank shutter 25 moves so as to enable the original to be copied. At the same time, the original plate 11 moves and the sensitive drum rotates in synchronism therewith so that the original image is copied by electrophotographic processing (Steps 16 and 17).

It is thus possible to prevent wasteful consumption of toner and occurrence of paper jamming after the copying unit or the board unit has deviated from a suitable relative position during board copying.

Next, the control of the exposure lamp during the on state of the power source will be described.

Figure 18:
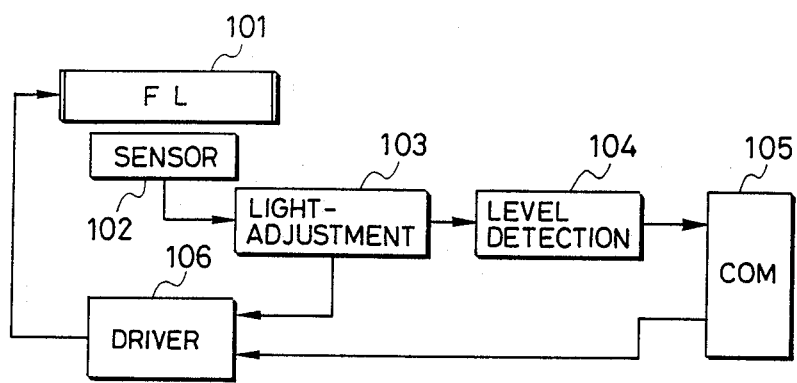
FIG. 18 is a block diagram of a lamp lighting circuit and a light quantity detection circuit.

FIG. 18 shows a block diagram of a lighting circuit and a quantity-of-light detection circuit for a sheet illumination lamp in the board unit in accordance with this embodiment. Light emitted from a sheet illumination lamp 101 is detected by an optical sensor 102. A dimmer circuit 103 operates to adjust the quantity of light emitted from the lamp 101, and a level detection circuit 104 operates to discriminate the quantity of light from the lamp 101. Other components are a microcomputer 105, and a lighting circuit 106 for lighting the lamp 101. The fluorescent lamp 33 shown in FIG. 3 may be used as the lamp 101. When the lighting circuit 106 receives a lighting signal supplied from the microcomputer 105, it lights up the illumination lamp 101. The lighting state of the illumination lamp 101 is supplied from the optical sensor 102 to the dimmer circuit 103 and to the level detection circuit 104. A signal from the dimmer circuit 103 is fed back to the lighting circuit 106 so as to maintain a set quantity of light. If the quantity of light emitted from the illumination lamp 101 reaches the necessary quantity so that the dimmer circuit starts to operate, an quantity-of-light OK signal is output from the level detection circuit 104 to the microcomputer 105. The microcomputer 105 has a memory ROM having a program defined by a flow chart shown in FIG. 20 and a program of controlling the operation of the board copying apparatus. The microcomputer controls related components on the basis of these programs.

Figure 19:
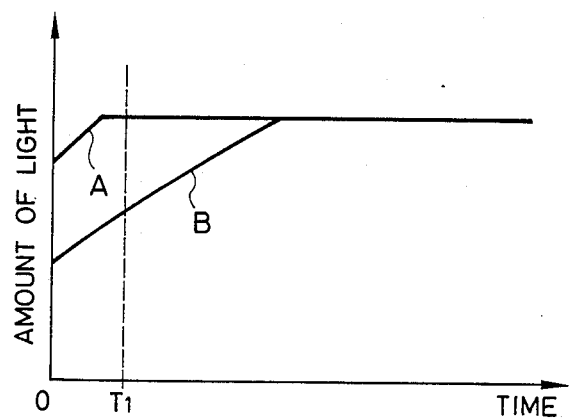
FIG. 19 is a graph showing the quantity of light produced by the lamp when the lamp is started.

FIG. 19 is a graph of start-up characteristics of the illumination lamp in accordance with this embodiment. A curve A indicates a characteristic at an ordinary temperature and a curve B indicates a characteristic at a low temperature. As shown in this graph, the time taken to increase the quantity of light to a predetermined quantity at the low temperature is much longer than that at the ordinary temperature.

The operation of this embodiment will be described below.

Figures 20, 21:
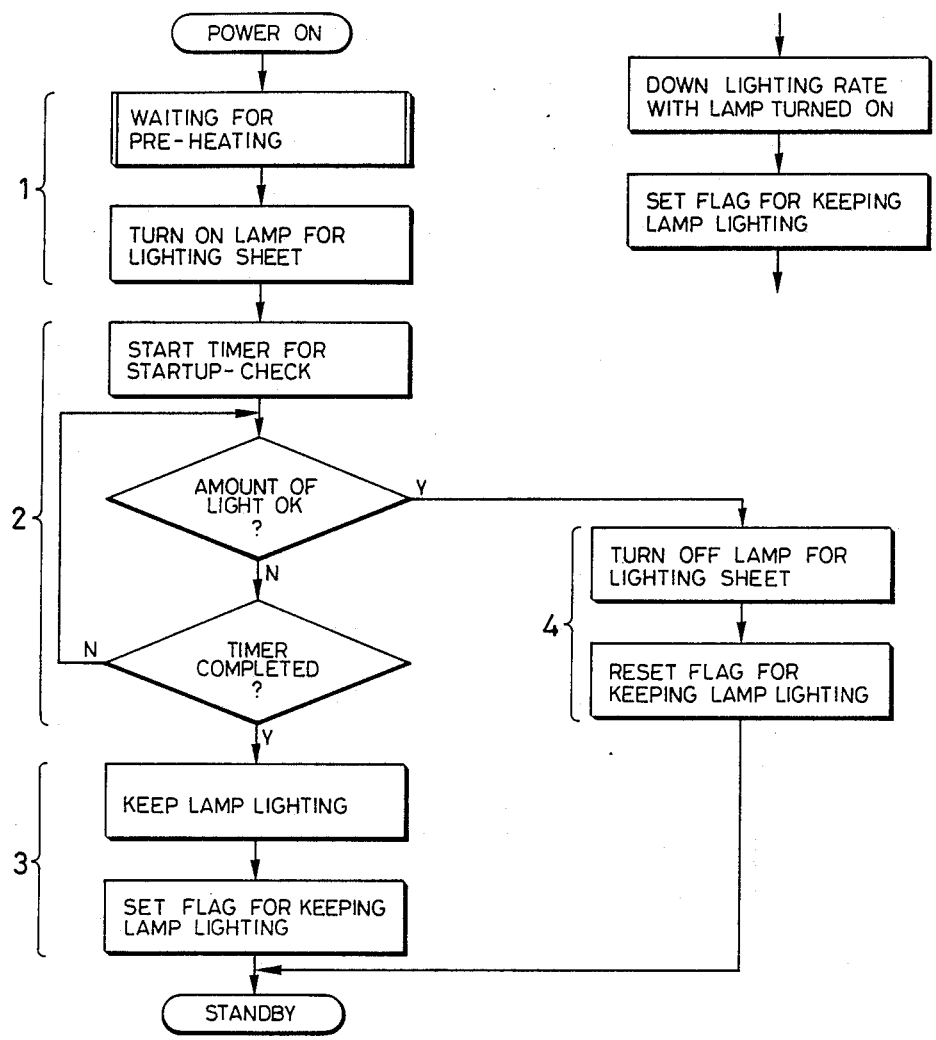
FIG. 20 is a flow chart of a process for checking the light quantity.
FIG. 21 is a flow chart showing the operation of another embodiment.

After, in the on state of the power source, the illumination lamp 101 has been pre-heated, it is lighted up (Step 1 in FIG. 20), and a period of time corresponding to $T_1$ in FIG. 19 is set in the timer so that the quantity of light is checked while the time-up is being observed (Step 2 in FIG. 20). The time that corresponds to $T_1$ in FIG. 19 is ordinarily set to a value determined by adding a margin for a possibility of a small variation in the period of time taken to obtain the necessary quantity of light at the ordinary temperature. The quantity of light is checked with time-up, and, if it does not become fixed at a certain degree, it is judged that the start-up is delayed by the low-temperature atmosphere. The illumination lamp is therefore kept lighting, and the process proceeds to the standby state while setting a flag which indicates the lighting and which is used for succeeding steps (Step 3 in FIG. 3). If the quantity of light reaches the constant value, it is judged that, at the time of commencement of the board copying operation, the process can be started after re-lighting the illumination lamp. The lamp is then turned off, a flag which indicates the lighting is set, and the process proceeds to the standby state (Step 4 in FIG. 20). The sheet moving operation and the board copying operation are thereafter performed in response to the operations of the operation key switches shown in FIGS. 8 and 9. In this case, the process is conducted in accordance with the state in such a manner that the state in which the illumination lamp is kept lighting or turned off is checked depending upon whether or not the flag that indicates the lighting of the lamp is set at the time of completion of copying.

In the standby state, Steps 207 onward are executed in the process shown in FIG. 5A are executed.

Another embodiment of the present invention will be described hereinunder. Briefly, this embodiment is obtained by substituting a process shown in FIG. 21 for the routine of Step 3 of the process shown in FIG. 20. In this case, the lamp is kept in lighting state and a signal for enabling the lamp with a reduced lighting rate is supplied to the lighting circuit thereby reducing the power supplied to the lamp. The lamp is then lit on with normal power when the operation is started with board copying mode and, after the operation in this mode is finished, the lighting rate is reduced again and the lamp is kept on with the reduced lighting rate. It is therefore possible to suppress the tendency for the lamp to deteriorate during the period in which the copying operation is not conducted.

In the described embodiment, the lamp is kept in the lighting state as a result of the operation check conducted when the power supply is turned on. Considering that the apparatus is used in meetings or conferences, it would be convenient to use a timer which measures a standard time of meeting or conference, e.g., 2 to 3 hours, so as to automatically shut-off the apparatus after elapse of the time set in the timer. Such an arrangement makes it possible to automatically shut-off the apparatus while prolonging the life of the lamp.

As will be understood from the foregoing description, according to the invention, it is possible to shorten the time until the process for board copying is commenced, even when the temperature is low.

A detailed description will be made hereinunder as to the relationship between the board copying mode and the main unit copying mode.

Figure 22:
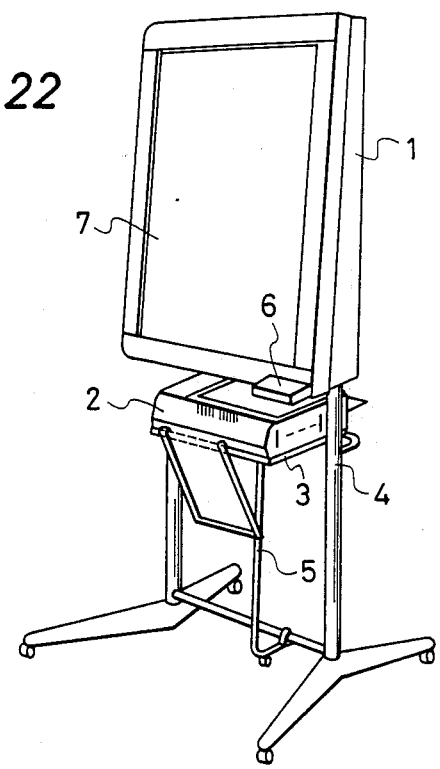
FIG. 22 is a perspective view of another embodiment of the board copying apparatus in the board copying mode.
Figure 23:
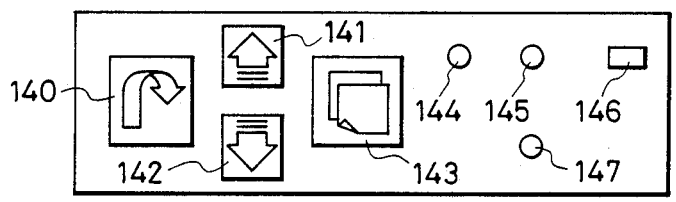
FIG. 23 is a plan view of a control panel of a board unit.

FIG. 22 shows the appearance of the apparatus in the board copying mode. The internal structure of the apparatus is the same as that shown in FIGS. 2 and 3. FIG. 23 is a plan view of another example of the operation panel 6. This operation panel 6 has key switches 140 to 142 for producing only instructions for moving the sheet. A numeral 143 denotes a key switch which gives an instruction for operation in the board copying mode. Numerals 144 to 147 are used to denote error indication lamps which indicates errors which occur during the operation in the board copying mode.

Figures 1, 25:
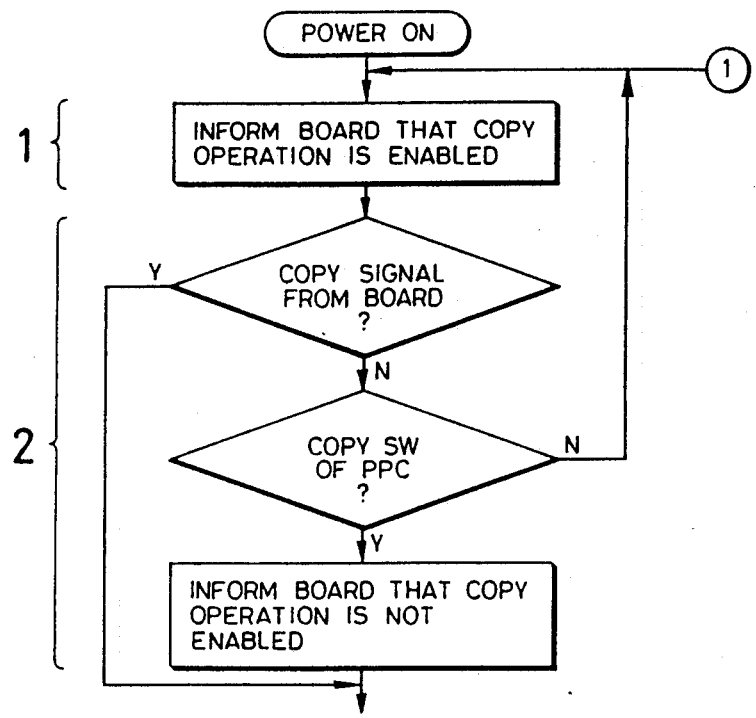
FIG. 25 is a schematic flow chart illustrating the operation of a copying unit.
Figures 2, 25:
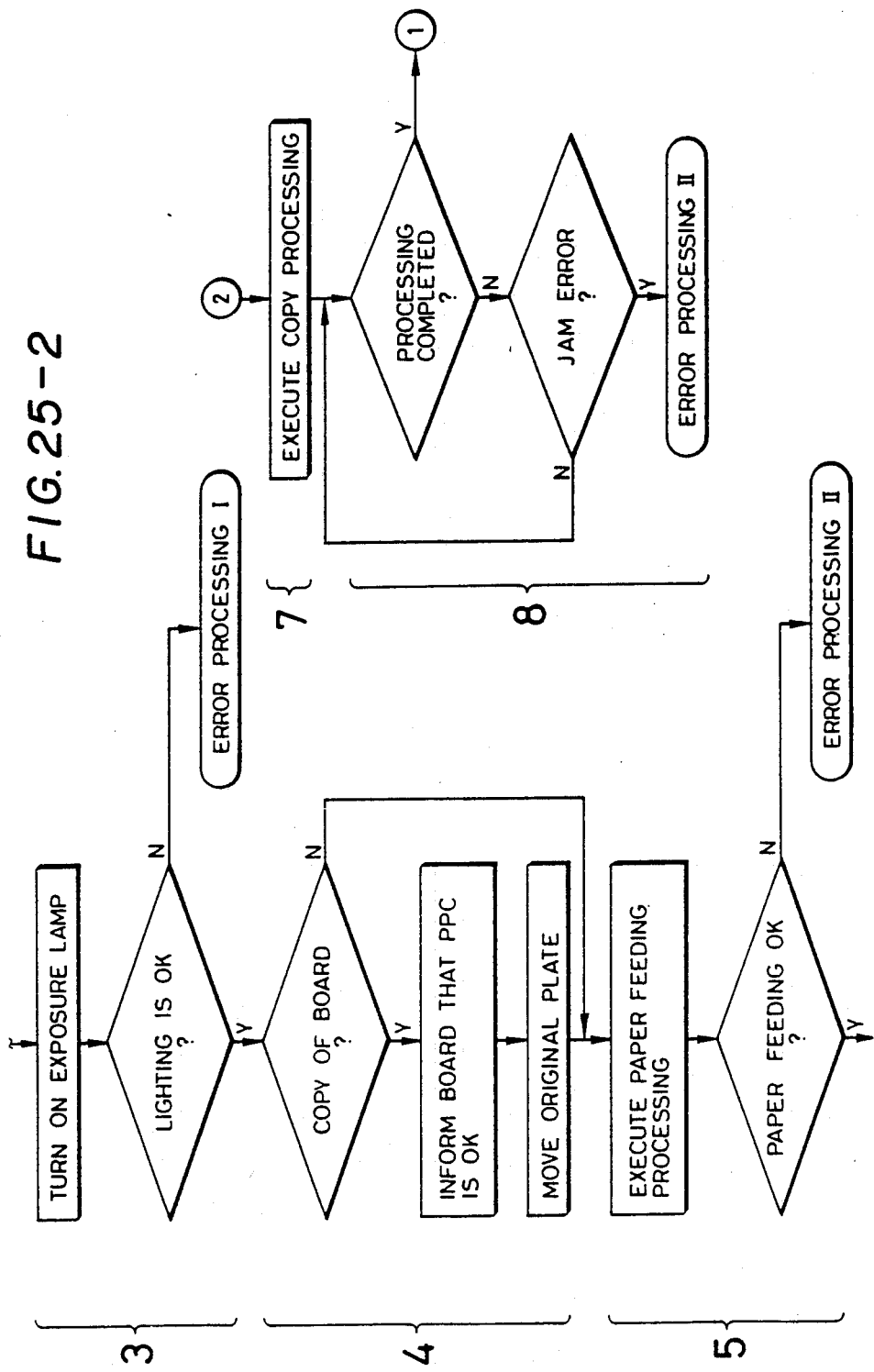
Figures 3, 25:
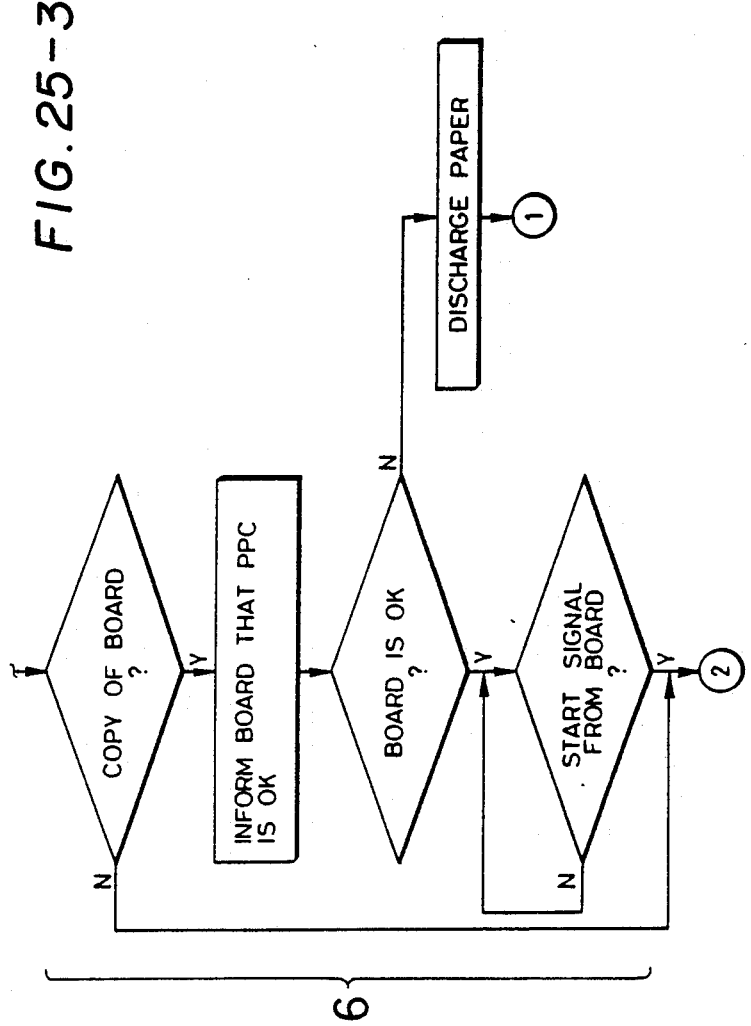
Figure 26:
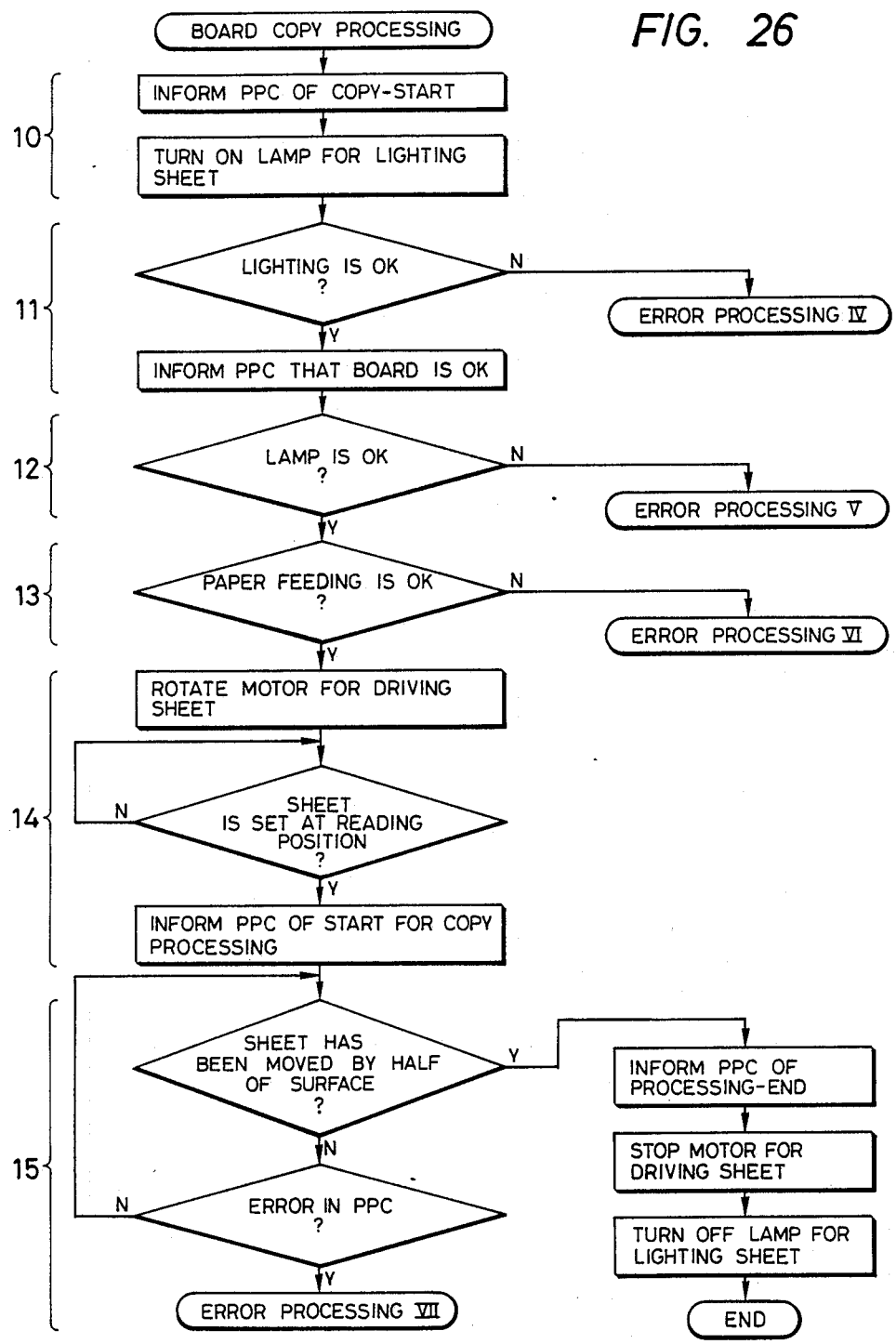
FIG. 26 is a schematic flow chart illustrating the operation of the apparatus in the board copying mode.
Figure 27:
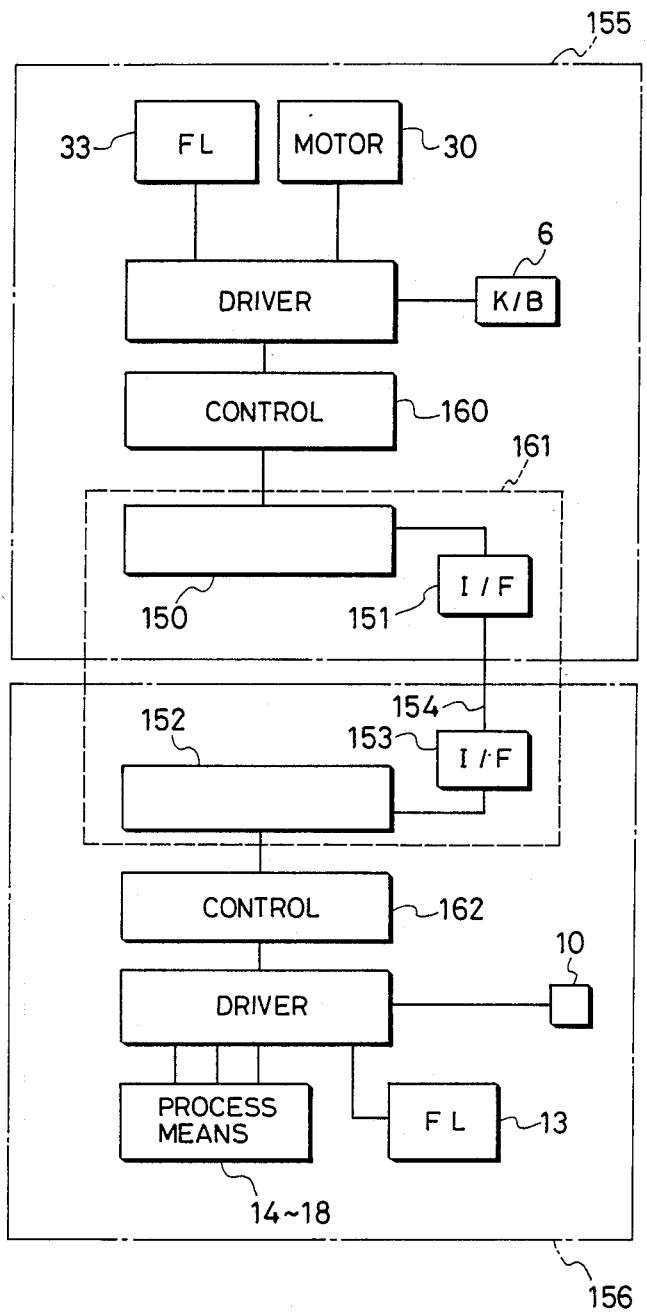
FIG. 27 is a block diagram schematically showing the constructions of the board unit and the copying unit.

The board unit and the copying unit body 2 are respectively provided with control units denoted by 155 and 156 in FIG. 27, each including a microcomputer. The microcomputer of the control unit for the board unit 1 has a ROM which stores a program as shown in FIG. 26. Similarly, a program as shown in FIG. 25 is stored in a ROM of the microcomputer incorporated in the control unit of the copying unit 2. Each of the microcomputers control processing sequences, detection sequences and analysis sequences in these process. Both control units have interface units denoted by 151 and 153 in FIG. 27 for signal exchange. Both interfaces are interconnected through an array of optical fibers 154 shown in FIG. 27.

Figure 24:
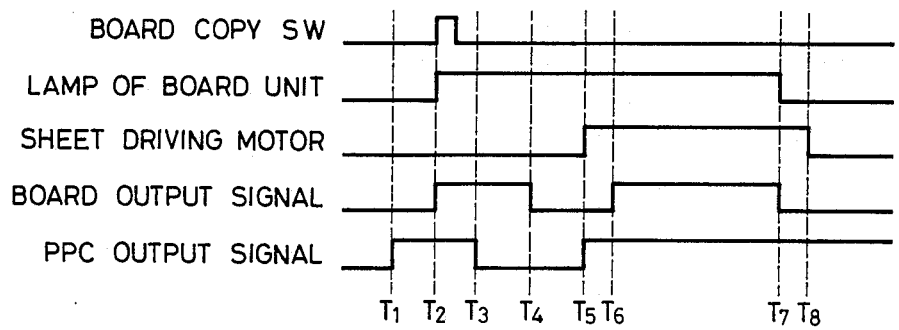
FIG. 24 is a time chart showing operation timings in a portion of operation in the board copying mode.

The operation of this embodiment will be explained with specific reference to FIGS. 24 to 26. FIG. 24 is a timing chart showing the operation of the board unit and interface signals as obtained during the operation of the apparatus in the board copying mode, FIG. 25 is a schematic flow chart showing the operation of the copying unit, and FIG. 26 is a schematic flow chart showing the operation of the board unit in the board copying mode. The sheet feeding operation, which is not directly related to the copying operation, is controlled by a sheet half feed key 140 (see FIG. 23). As this key is operated, the sheet driving motor is operated by a predetermined amount so that the sheet is fed a length equal to one half of the overall length thereof, thereby switching-over the display. A key 141 (see FIG. 23) is adapted for effecting a forward feed of the sheet for the purpose of fine adjustment of the sheet position. The sheet is fed forward as long as this key switch is pressed. A key 142 (see FIG. 23) is adapted for effecting a backward feed of the sheet for the purpose of fine adjustment of the sheet position. The sheet is fed backward as long as this key switch is pressed. The sheet feeding operation is not directly related to the copying operation so that no signal is delivered to the copying unit during feeding of the sheet, nor the check of the state of the copying unit is conducted when the sheet feeding operation is commenced.

Referring now to the copying operation in the board copying mode, signals from the copying unit are checked in response to the operation of a copy start key 143 (see FIG. 23), before the process shown in FIG. 26 is commenced. The apparatus has a sequence (not shown) which is adapted to ignore key input when the copying unit is not ready for operation due to, for example, a too low temperature of the fixing unit, in accordance with the result of the check of the signals from the copying unit. This sequence therefore is executed in advance of the timing $T_1$ in the timing chart shown in FIG. 24. The copying unit becomes ready to operate in the period between the moments $T_1$ and $T_2$ in FIG. 24 corresponding to Steps 1 and 2 in FIG. 25. As the copy start instruction is input through the copy start key at the moment $T_2$ in FIG. 24, the board unit delivers to the copying unit a signal indicative of the starting instruction in Step 10 in FIG. 26. At the same time, the sheet illuminating lamp 33 is lit on and the check of the state of lighting is conducted in Step 11 in FIG. 26. Upon receipt of the operation start signal from the board unit, the copying unit operates to turn the exposure lamp 13 on and the state of lighting of this lamp is checked in Step 3 in FIG. 25. If the state of the exposure lamp is normal, a signal indicative of this fact is transmitted to the board unit, and the original plate is moved so as to open the path of light from the board unit, while commencing feeding of copy paper. This operation is conducted at the moment $T_3$ in FIG. 24, corresponding to Steps 4 and 5 in FIG. 25. When the normal state of the illuminating lamp 33 is confirmed, the board unit delivers to the copying unit a signal which indicates that the board unit is ready for operation, at the moment $T_4$ in FIG. 24. If the signal indicative of the ready-to-operate condition of the copying unit has been received since the moment $T_3$, the process waits for the delivery of a next signal which indicates that the paper has been fed normally. These operations are conducted in Steps 12 to 13 in FIG. 26.

When the feed of the paper has been completed safely, the copying unit delivers to the board unit a signal which indicates the safe completion of feed of the paper, and waits for the receipt of the copying start signal from the board unit. These operations are executed in Step 6 in FIG. 25. Upon receipt of the signal indicative of the safe completion of feed of the paper, the board unit operates to start the sheet driving motor 30 at a moment $T_5$ in FIG. 24. When the leading end of the image to be copied has reached the reading position, the board unit delivers to the copying unit a start signal for instructing the copying unit to start the copying operation, at a moment $T_6$ in FIG. 24 corresponding to Step 14 in FIG. 26. The board unit then feeds the sheet 7 while checking for error signals from the copying unit. This operation is conducted in the period between moments $T_6$ and $T_7$, in Step 15 in FIG. 26. In response to the start signal from the board unit, the copying unit executes a copying process similar to that of the ordinary copying operation, while checking for any error such as a paper discharge failure, i.e., that the paper 9 has not been discharged in the expected time. The copying operation is executed in Steps 7 and in FIG. 25. When the operation has safely proceeded to the moment $T_7$, the board unit delivers a signal representing safe completion of the process, and feeds the sheet a distance corresponding to one frame of the image on the sheet and then stops the feed of the sheet at a moment $T_8$ in FIG. 24. Then, the board unit is reset to the standby state (not shown) to wait for the next key input. The copying unit also is reset to the standby state corresponding to Steps 1 and 2 in FIG. 25. The checking operation in Steps 3, 5, 6 and 8 in FIG. 25, as well as the checking operations in Steps 11 to 13 in FIG. 26, are conducted by confirming safe states within given times set in a timer. If the safe states could not be confirmed within a predetermined time, it is judged that some error is taking place, and a process for dealing with the error is commenced.

The copying operation in the main unit copying mode can be started by turning on the copy switch on the copying main unit. When this switch is turned on in the period between Steps 1 and 2 in FIG. 25, a copy unable signal is delivered to the board unit so as to prohibit receipt of signal input from the copy switch 143 on the board unit. The copying process in the main unit copying mode is executed in the same manner as that in the board copying mode, except that the exchange of signals between the board unit and the copying unit is omitted.

The photosensitive drum 12 of the copying unit, i.e., the copying process speed, is the same regardless of whether the selected mode is the board copying board or the main unit copying mode. This makes it possible to control the copying operation in both modes by making use of most part of a single control sequence, without requiring independent sequences for controlling the operations in the respective modes. The speed of feed of the sheet 7 is controlled in a predetermined proportion to the drum rotation speed, depending on the magnification of the image size.

In this embodiment, each of the board unit and the copying unit is provided with its own control unit 155, 156 (see FIG. 27). Thus, the first control means for controlling the process of the board unit corresponds to a portion 160 (see FIG. 27) of the control unit 155 annexed to the board unit, while the second control means for controlling the process of the copying unit corresponds to a portion 162 (see FIG. 27) of the control unit 156 annexed to the copying unit. The control means for operating the first and second control means is constituted by portions 161 (see FIG. 27) of the control units 155 and 156 of both the board unit and the copying unit.

In the described embodiment of the invention, both the board unit and the copying unit are provided with their own control units each incorporating a microcomputer. This, however, is not exclusive and the arrangement may be such that the control unit is provided only one of these two units, while the other unit is equipped with detecting systems and driving systems. Such a modification offers an advantage in that the interface of signal exchange between the board unit and the copying unit can be dispensed with.

In the embodiments described hereinbefore, the copying operation for copying an image on the board is prohibited during continuous copying operation in the main unit copying mode. A troublesome operation therefore is required when a demand for copying an image on the board has occurred during continuous copying operation in the main unit copying mode. A description will be made hereinunder as to an embodiment which permits an easy interruption of continuous copying operation in main unit copying mode by a demand for copying an image on the board and easy recovery of the continuous copying process in the main unit copying mode after the copying process for copying the board image is completed.

Figures 1, 28:
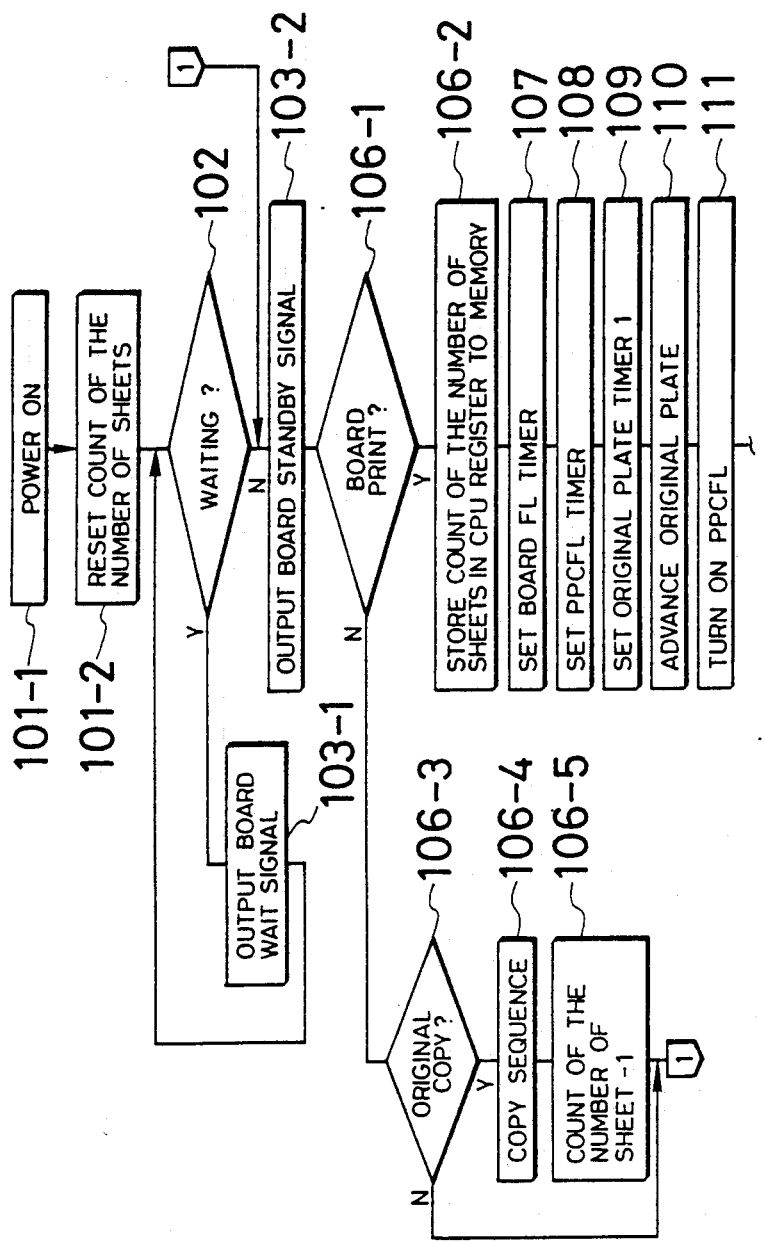
FIG. 28 is a flow chart explanatory of an interruption routine for allowing an interruption of a continuous copying in main unit copying mode by a demand for copying a board image.
Figures 2, 28:
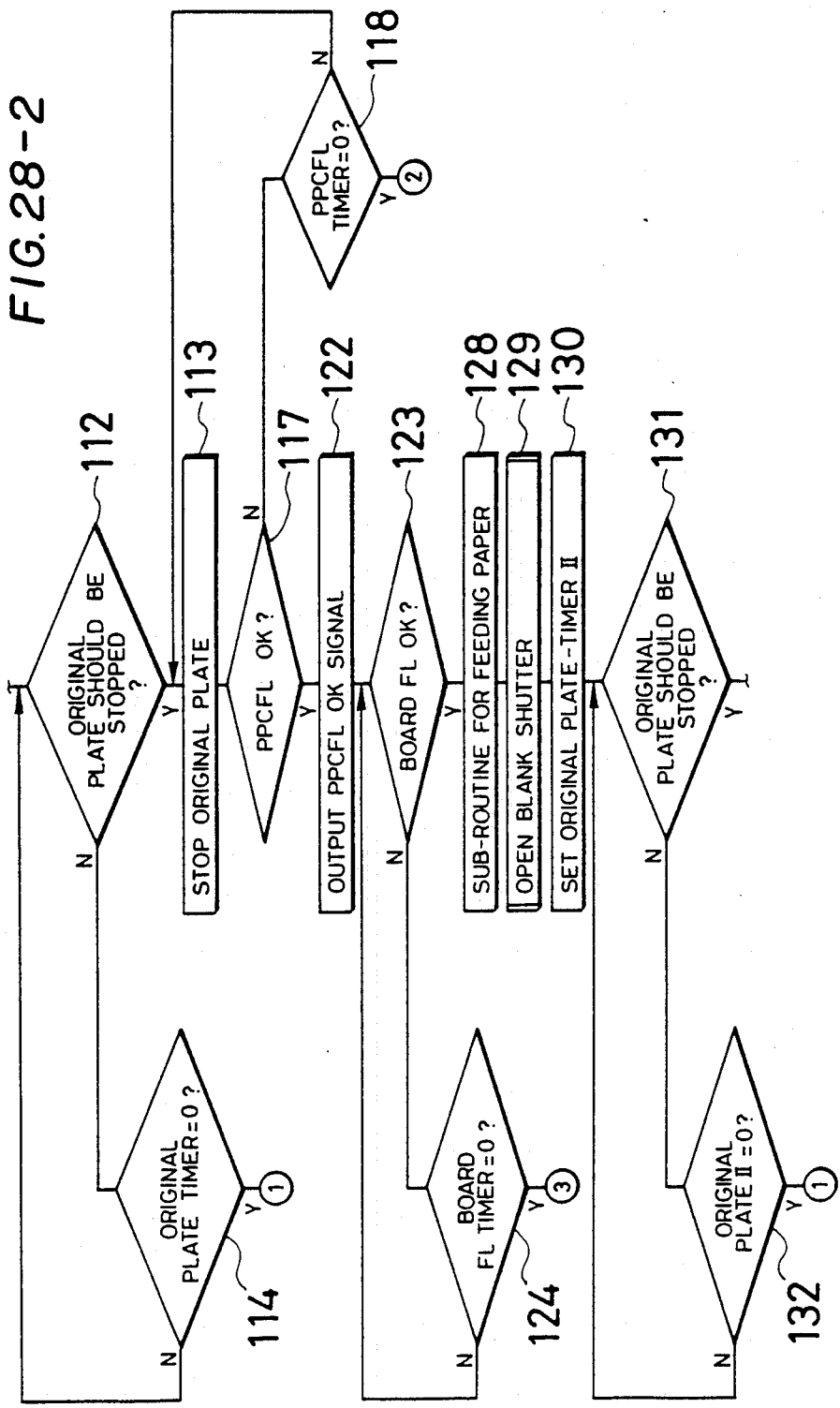
Figures 3, 28:
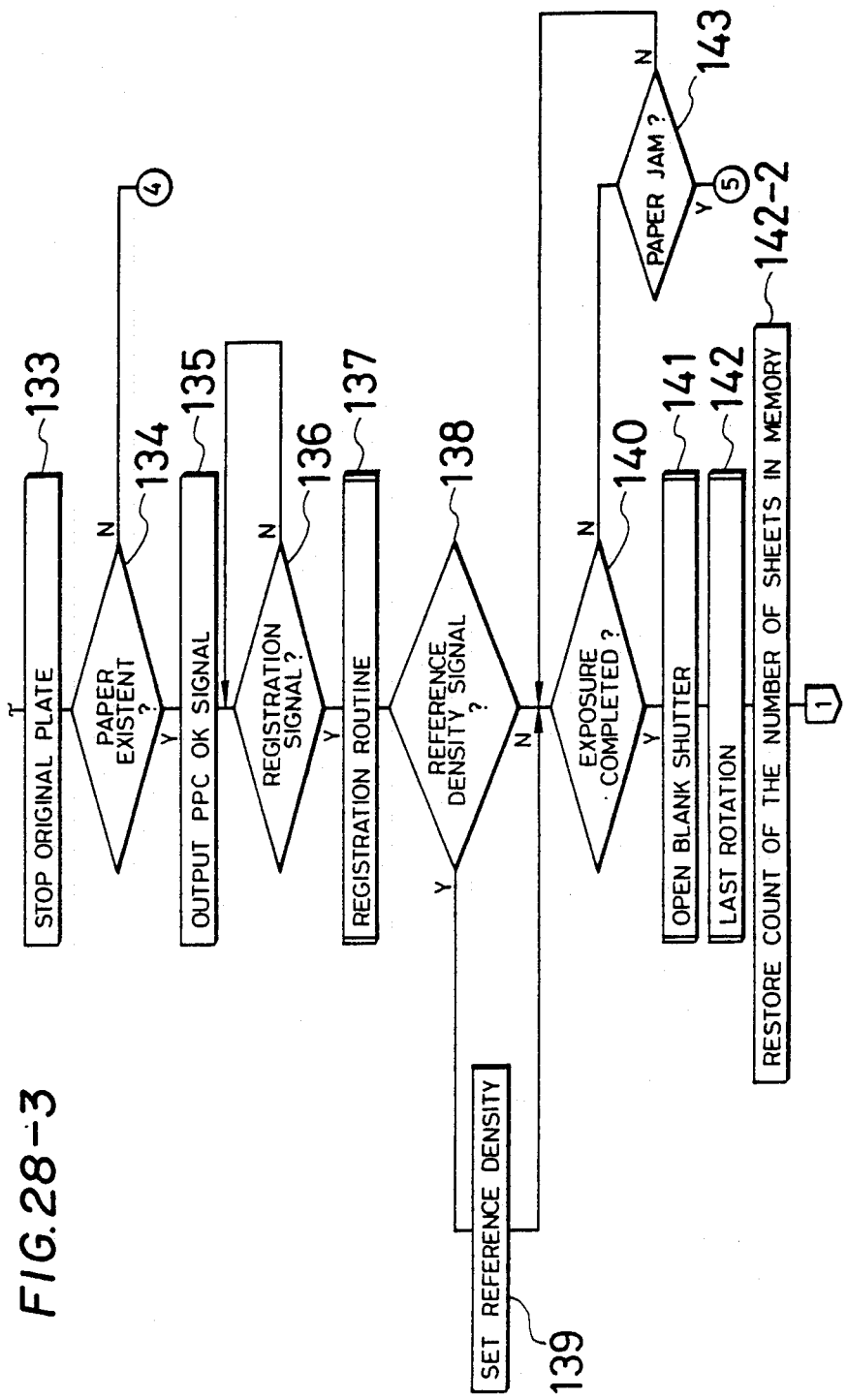

The description will proceed on the basis of the arrangements shown in FIGS. 1 to 4. The operations of the board unit and the copying unit in this embodiment are substantially the same as that explained before in connection with FIGS. 5A and 5C, though the operation shown in FIG. 5A requires a slight modification. More specifically, an operation which will be described with reference to FIG. 28 is executed in place of the operation shown in FIG. 5A. In FIG. 28, the same reference numerals are used to denote the steps which conduct the same routines as the steps in the operation shown in FIG. 5A and detailed description of such steps is omitted.

When the power supply switch on the operation panel 6 of the board 1 is turned on, the copying unit 2 commences the routine 101-1 of the flow chart shown in FIG. 28 for controlling the copying unit 2. At the same time, the board unit 1 commences the routine 201 of the control flow chart for the board unit 1 shown in FIG. 5B.

The copying unit 2 resets the copy count in Steps 101-2 and waits for the rise of the temperature of the fixing device up to a set value. During waiting, the copying unit 2 delivers oscillated pulse signal (board wait signal) to the board unit in Step 103-1. If the present state is not the waiting condition, the copying unit 2 delivers a board standby signal to the board unit in Step 103-2.

When no board print signal 106-1 is available, the copying unit conducts a judgment as to whether the apparatus is in the state for copying originals on the copying unit. This state is triggered by a printing instruction given through an operation of the switch 10 or, alternatively, this state exists when the content of the copy counter has not been reduced to zero during continuous copying operation. If this state is confirmed in Step 106-3, the copying sequence is started in Step 106-4 and continued while conducting down-counting of the copy counter in Step 106-5 so as to effect a decrement by "1" in the counter and the process returns to the state for waiting for the key input. This operation is repeated until the content of the copy counter is reduced to zero.

On the other hand, when a board print signal is delivered to the copying unit in Step 106-1, a judgment is conducted as to whether the present state is for copying originals or not, as in the case of the judgment conducted in Step 106-3 mentioned before. If the present state is not for copying originals, the process proceeds to Step 107. Conversely, if the present state is for copying originals, the content of the register in the CPU for counting the number of copied sheet is transferred to a memory (RAM) in the same CPU. When the board print signal is received during continuous copying operation for obtaining a plurality of copies, the rest number of copies to be obtained is set in the register. If not, "0" is set in the register.

Upon receipt of an exposure completion signal in Step 140, the copying unit commences the routine for shutting off the blank shutter in Step 141 and then conducts a drum rotating routine for cleaning the drum 12 in Step 142-1. If the continuous copying of original has been interrupted, the value which has been transferred to the memory is sent back to the memory in Step 142-2 and then the stand-by mode is started.

It will be understood that, in this embodiment, it is possible to interrupt a continuous copying operation in main unit copying mode by a demand for a copy operation in board copying mode, so that the image on the board can be copied preferentially. After the completion of the copy in the board copying mode, the continuous copying operation in the main unit copying mode is started again to produce the desired number of copies.

Figure 29:
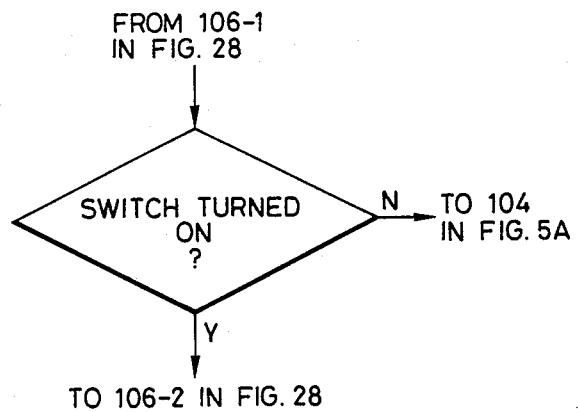
FIG. 29 is a flow chart of a modification of the routine as shown in FIG. 28.

This embodiment may conveniently be modified such that a switch operable by an operator or a service engineer is provided on the copying unit or on the board unit so as to enable him to freely select a mode which permits the board image to be copied preferentially by interrupting continuous copying of original on the copying unit or a mode in which such an interruption is rejected. This can be achieved easily by adopting a processing step as shown in FIG. 29 between Steps 106-1 and 106-2 in FIG. 28. Preferably, this modification is arranged such that the demand for copying of the board image is preferentially accepted when the switch has been turned on.

Although the invention has been described through its preferred forms, it is to be understood that the described embodiments are only illustrative and various changes and modifications may be imparted thereto without departing from the scope of the invention which is limited solely by the appended claims.

What is claimed is:

1. A board copying apparatus comprising:
board means carrying a sheet which enables an image to be written thereon;
copying means for selective copying on a recording material an image written on said sheet and capable of forming, on said recording material, a copy image of an image of an original different from said sheet;
first density setting means for setting the density of said copy image of said image written on said sheet;
second density setting means for setting the density of said copy image of said image on said original; and
copying density control means for automatically controlling said first and second density setting means such that when said copying means copies said image written on said sheet, a copying operation is executed with a density set by said first density setting means regardless of a density set by said second density setting means, and such that when said copying means copies said image of said original, a copying operation is executed with a density set by said second density setting means regardless of a density set by said first density setting means.

2. A board copying apparatus according to claim 1, wherein said first density setting means is provided on said board means.

3. A board copying apparatus according to claim 1, wherein said second density setting means is provided on said copying means.

4. A board copying apparatus according to claim 1, wherein said board means includes first exposure means for exposing said image written on said sheet, while said copying means includes a second exposure means for exposing said image on said original.

5. A board copying apparatus according to claim 1, wherein said first density setting means is adapted to set the copy density at a predetermined constant level.

6. A board copying apparatus according to claim 5, wherein said first density setting means includes means for modifying said predetermined constant level.

7. A board copying apparatus according to claim 1, wherein said second density setting means enables the copy density to be set at any desired level.

8. A board copying apparatus according to claim 1, wherein said first density setting means sets a density associated with a density of texture of said sheet.

9. A board copying apparatus comprising:
board means having a sheet on which information is writable;
copying means for copying on a recording material an image written on said sheet;
first density setting means for setting a copy density of said image at a predetermined constant level by keeping constant an operation condition regarding a density of said copying means;
second density setting means for setting a copy density of said copy image at a desired level; and
selecting means for selecting one of said first and second density setting means when an image written on said sheet is copied.

10. A board copying apparatus according to claim 9, wherein said first density setting means includes means for modifying said predetermined constant level.

11. A board copying apparatus according to claim 9, wherein said first density setting means sets a density associated with a density of texture of said sheet.

12. A board copying apparatus according to claim 9, wherein said copying apparatus includes means for selectively copying said image written on said sheet and an image of an original different from said written image.

13. A board copying apparatus according to claim 12, wherein said copying means executes the copying operation with a density set by said second density setting means when said image of said original is copied.

14. A board copying apparatus comprising:
board means having a sheet on which information is writable;
copying means for repeatedly copying on a recording material an image written on said sheet, said copying means and said board means being mutually movable;
transfer means for transferring said image written on said sheet to said copying means;
detecting means for detecting relative position between said board means and said copying means during a copying operation; and
controlling means for stopping the operation of said copying means and discharging said recording material which was used for the copying operation when said detecting means detects a relative positional shift between said board means and said copying means during the copying operation of said image written on said sheet.

15. A board copying apparatus according to claim 14, further comprising exposure means exposing said image written on said sheet, said transfer means further including a light-receiving window for receiving light reflected from said sheet and a shutter for shutting off the light coming through said light-receiving window, said controlling means being adapted for shutting off said shutter upon detection of a shift of relative position.

16. A board copying apparatus according to claim 14, further comprising means for moving said sheet, said controlling means being adapted to move said sheet to a predetermined position upon detection of a shift of relative position.

17. A board copying apparatus according to claim 16, wherein said controlling means moves said sheet to a position where said sheet was positioned before the copying operation.

18. A board copying apparatus according to claim 16, wherein said controlling means moves said sheet by a single image from a position where said sheet was positioned before the copying operation.

19. A board copying apparatus according to claim 14, wherein said copying means includes scanning means for scanning said original, and wherein said copying means selectively copies said image written on said sheet and said image of said original.

20. A board copying apparatus comprising:
board means having a sheet on which information is writable;
moving means for moving said sheet;
copying means for copying on a recording material an image written on said sheet while said moving means is moving said sheet;
detecting means for detecting an abnormality of said recording material; and
controlling means for controlling said copying means and said moving means such that when said detecting means detects said abnormality, operation of said copying means is stopped and said moving means moves said sheet to a position wherein said sheet has been positioned before the copying operation.

21. A board copying apparatus according to claim 20, wherein said copying means includes a second scanning means for scanning an original and is adapted for forming a copy image of an image on said original scanned by said second scanning means.

22. A board copying apparatus according to claim 20, further comprising exposure means for allowing said image written on said sheet to be exposed, said controlling means being adapted to stop the operation of said exposure means upon receipt of output signal from said jam detecting means indicative of jamming of said recording material.

23. A board copying apparatus comprising:
board means having a sheet on which information is writable;
exposing means for exposing an original written on said sheet;
detecting means for detecting a quantity of light from said exposing means;
a switch for supplying power to said exposing means; and
control means for controlling said exposing means such that said exposing means is turned on in response to power supplied by said switch and such that when a quantity of light from said exposing means is more than or equal to a predetermined value after a predetermined time period since the turn on of said exposing means, said exposing means is turned off, and when said quantity of said light is less than said predetermined value after said predetermined time period since the turn on of said exposing means, said exposing means is maintained on.

24. A board copying apparatus according to claim 23, wherein said control means controls said exposing means such that when said quantity of said light is less than said predetermined value after said predetermined time period, said exposing means is maintained on with a lower power.

25. A board copying apparatus comprising:
board means having a sheet on which information is writable;
exposure means for exposing an image written on said sheet;
copying means for selectively copying on a recording material said image written on said sheet and an image of an original different from said written image;
optical means for selectively transmitting and intercepting a reflecting light from said image exposed by said exposing means to said copying means; and
control means for controlling said optical means such that when said image written on said sheet is copied, said optical means intercepts said reflecting light to said copying means until a completion of preparation for a copying operation, and said optical means allows a transmission of said reflecting light to said copying means after completion of preparation for the copying operation.

26. A board copying apparatus according to claim 25, wherein said optical means includes a shutter for selectively shutting off said reflecting light from said sheet.

27. A board copying apparatus according to claim 25, wherein said controlling means is adapted for prohibiting the formation of said copy image of said image written on said sheet, when the quantity of light from said exposure means has failed to reach a predetermined level in a predetermined time.

28. A board copying apparatus according to claim 25, further comprising detecting means for detecting a quantity of light from said exposing means, wherein said control means recognizes said completion of preparation when said quantity of light from said exposing means reaches a predetermined value.

* * * * *

UNITED STATES PATENT AND TRADEMARK OFFICE
CERTIFICATE OF CORRECTION

PATENT NO. : 4,905,040

DATED : February 27, 1990

INVENTOR(S) : MAMORU NAGAI, ET AL.

It is certified that error appears in the above-identified patent and that said Letters Patent is hereby corrected as shown below:

SHEET 2 OF 29

FIG. 4, Block 39, "REGURATOR" should read --REGULATOR--.
FIG. 4, Block 62, "REGURATOR" should read --REGULATOR--.

SHEET 15 OF 29

FIG. 13, Block 39, "REGURATOR" should read --REGULATOR--.
FIG. 13, Block 62, "REGURATOR" should read --REGULATOR--.

COLUMN 1

Line 25, "adjustment of" should be deleted.
Line 35, "be" should be deleted.

COLUMN 2

Line 20, "ing the" should read --ing to the--.
Line 31, "apparatus;" should read --apparatus.--.

COLUMN 4

Line 33, "an" should read --a--.

COLUMN 7

Line 39, "of" should read --off-- and "off" should read --of--.

UNITED STATES PATENT AND TRADEMARK OFFICE
CERTIFICATE OF CORRECTION

PATENT NO. : 4,905,040
DATED : February 27, 1990
INVENTOR(S) : MAMORU NAGAI, ET AL.

Page 2 of 3

It is certified that error appears in the above-identified patent and that said Letters Patent is hereby corrected as shown below:

COLUMN 8

Line 7, "is" should read --are--.
Line 49, "indicate" should read --to indicate--.

COLUMN 9

Line 12, "repeated." should read --be repeated.--.

COLUMN 11

Line 16, "an" should read --a--.

COLUMN 12

Line 50, "these" should read --this--.

COLUMN 14

Line 7, "Steps 7 and" should read --Steps 7 and 8--.

COLUMN 15

Line 66, "sheet" should read --sheets--.

UNITED STATES PATENT AND TRADEMARK OFFICE
CERTIFICATE OF CORRECTION

PATENT NO.  : 4,905,040

DATED     : February 27, 1990

INVENTOR(S) : MAMORU NAGAI, ET AL.

Page 3 of 3

It is certified that error appears in the above-identified patent and that said Letters Patent is hereby corrected as shown below:

COLUMN 16

Line 8, "original" should read --originals--.
    Line 44, "capable" should be deleted.
    Line 45, "of forming, on said recording material, a copy" should be deleted.
    Line 46, "image of" should be deleted.

Signed and Sealed this

Twenty-seventh Day of August, 1991

Attest:

HARRY F. MANBECK, JR.

Attesting Officer

Commissioner of Patents and Trademarks